US009570773B2

(12) United States Patent
Yamane et al.

(10) Patent No.: US 9,570,773 B2
(45) Date of Patent: Feb. 14, 2017

(54) FLUORINE-BASED POLYMER ELECTROLYTE MEMBRANE

(75) Inventors: Michiyo Yamane, Tokyo (JP); Naoto Miyake, Tokyo (JP)

(73) Assignee: ASAHI KASEI E-MATERIALS CORPORATION, Tokyo (JP)

( * ) Notice: Subject to any disclaimer, the term of this patent is extended or adjusted under 35 U.S.C. 154(b) by 676 days.

(21) Appl. No.: 13/877,726

(22) PCT Filed: Oct. 5, 2011

(86) PCT No.: PCT/JP2011/072997
§ 371 (c)(1),
(2), (4) Date: May 28, 2013

(87) PCT Pub. No.: WO2012/046777
PCT Pub. Date: Apr. 12, 2012

(65) Prior Publication Data
US 2013/0244135 A1 Sep. 19, 2013

(30) Foreign Application Priority Data

Oct. 7, 2010 (JP) .................................. 2010-227918

(51) Int. Cl.
*H01M 8/1044* (2016.01)
*H01M 8/1062* (2016.01)
(Continued)

(52) U.S. Cl.
CPC ........... *H01M 8/1018* (2013.01); *C08J 5/2206* (2013.01); *C08L 27/18* (2013.01);
(Continued)

(58) Field of Classification Search
CPC ....................................................... H01M 8/10
(Continued)

(56) References Cited

U.S. PATENT DOCUMENTS 3,962,153 A    6/1976 Gore
4,945,125 A    7/1990 Dillon et al.
(Continued)

FOREIGN PATENT DOCUMENTS

EP    2128919    12/2009
EP    2405517    1/2012
(Continued)

OTHER PUBLICATIONS

Search report from International Patent Appl. No. PCT/JP2011/072997, mail date is Nov. 8, 2011.
Search report from E.P.O, mail date is Jul. 18, 2013.

*Primary Examiner* — James Lee
(74) *Attorney, Agent, or Firm* — Greenblum & Bernstein P.L.C.

(57) ABSTRACT

An object of the present invention is to provide a polymer electrolyte membrane meeting power generation properties and physical durability at the same time and having high durability. A polymer electrolyte membrane comprising a microporous membrane and a fluorine-based polymer electrolyte contained in a pore of the microporous membrane, wherein pore distribution of the microporous membrane has a pore distribution with a center of distribution in a pore diameter range of 0.3 μm to 5.0 μm, and the fluorine-based polymer electrolyte composition contains a fluorine-based polymer electrolyte (component A) having an ion exchange capacity of 0.5 to 3.0 meq/g.

11 Claims, 1 Drawing Sheet

(51) Int. Cl.
*C08J 5/22* (2006.01)
*H01M 8/10* (2016.01)
*C08L 27/18* (2006.01)
*C09D 127/22* (2006.01)
*H01B 1/12* (2006.01)

(52) U.S. Cl.
CPC ........... *C09D 127/22* (2013.01); *H01B 1/122* (2013.01); *H01M 8/103* (2013.01); *H01M 8/1023* (2013.01); *H01M 8/1032* (2013.01); *H01M 8/1039* (2013.01); *H01M 8/1044* (2013.01); *H01M 8/1062* (2013.01); *C08J 2323/18* (2013.01); *C08L 2205/02* (2013.01); *H01M 8/106* (2013.01); *H01M 2008/1095* (2013.01); *Y02E 60/521* (2013.01)

(58) Field of Classification Search
USPC .............................. 429/492, 482; 521/25–39
See application file for complete search history.

(56) References Cited

U.S. PATENT DOCUMENTS

| | | | |
|---|---|---|---|
| 5,082,472 A | 1/1992 | Mallouk et al. | |
| 5,547,551 A | 8/1996 | Bahar et al. | |
| 5,910,277 A | 6/1999 | Ishino et al. | |
| 2005/0053822 A1 | 3/2005 | Miyake et al. | |
| 2005/0186461 A1* | 8/2005 | Hommura et al. | 429/33 |
| 2009/0220844 A1 | 9/2009 | Suzuki et al. | |
| 2010/0015496 A1 | 1/2010 | Miyake et al. | |
| 2011/0318669 A1 | 12/2011 | Miyake et al. | |
| 2014/0199613 A1* | 7/2014 | Chappey | C08G 73/10 429/492 |

FOREIGN PATENT DOCUMENTS

| | | |
|---|---|---|
| JP | 51-30277 A | 3/1976 |
| JP | 1-501876 A | 6/1989 |
| JP | 5-75835 B2 | 10/1993 |
| JP | 7-68377 B2 | 7/1995 |
| JP | 10-30031 A | 2/1998 |
| JP | 2007-165204 A | 6/2007 |
| JP | 2008-235184 A | 10/2008 |
| JP | 2009-242688 A | 10/2009 |
| JP | 4402625 B2 | 1/2010 |
| JP | 2010-170823 | 8/2010 |
| WO | 2005/000949 A1 | 1/2005 |
| WO | 2008/102851 A1 | 8/2008 |
| WO | 2010/101195 A1 | 9/2010 |

* cited by examiner

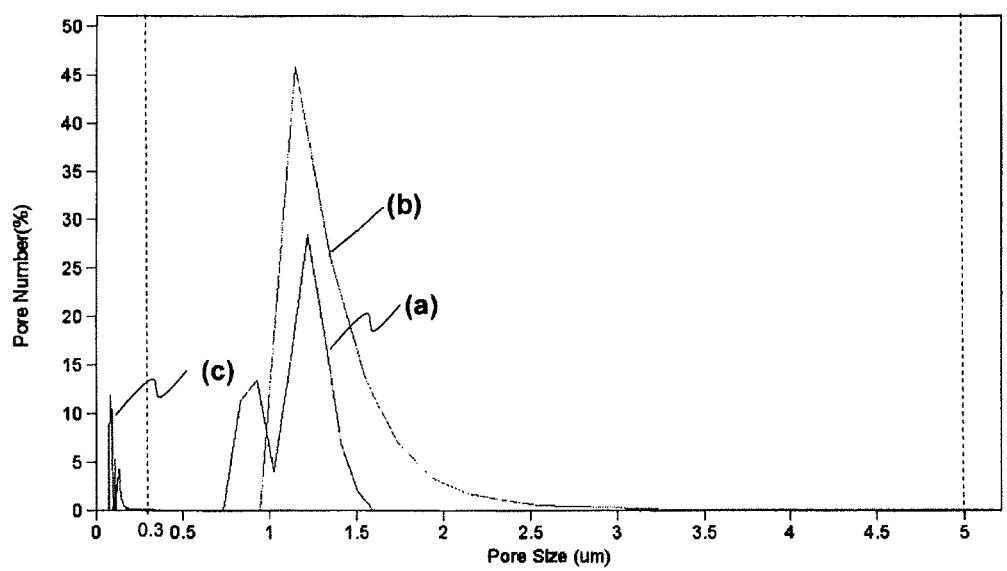

FLUORINE-BASED POLYMER ELECTROLYTE MEMBRANE

TECHNICAL FIELD

The present invention relates to a fluorine-based polymer electrolyte membrane.

BACKGROUND ART

Fuel cells electrochemically oxidize fuel such as hydrogen and methanol within the fuel cells. Thereby, fuel cells directly convert chemical energy of the fuel into electric energy and extract it. For this, fuel cells receive attention as a clean electric energy supply source. Particularly, polymer electrolyte fuel cells are expected as an alternative power source for automobiles, home co-generation systems, portable generators, and the like because of its operation at a lower temperature as compared to other fuel cells.

Such a polymer electrolyte fuel cell includes at least a membrane electrode assembly in which a gas diffusion electrode, which is produced by laminating an electrode catalyst layer (anode catalyst layer, cathode catalyst layer) and a gas diffusion layer, is bonded to both surfaces of a proton exchange membrane. Here, the proton exchange membrane is a polymer electrolyte membrane comprising a composition having a strong acidic group such as a sulfonic acid group and a carboxylic acid group in the polymer chain and having properties to selectively transmit protons. As an example of such a composition used for the proton exchange membrane, perfluoro proton composition such as Nafion (registered trademark, made by E. I. du Pont de Nemours and Company) which has a high chemical stability is exemplified and is preferably used.

During operation of a fuel cell, a fuel (for example, hydrogen) is fed to an anode gas diffusion electrode, and an oxidizing agent (for example, oxygen or air) is fed to a cathode gas diffusion electrode respectively. The two electrodes are connected via an external circuit to attain the operation of the fuel cell. Specifically, when hydrogen is used as a fuel, hydrogen is oxidized on an anode catalyst in the anode catalyst layer and then protons are produced. After passing through a proton-conductive polymer in the anode catalyst layer, the protons move inside of the proton exchange membrane and pass through a proton-conductive polymer in the cathode catalyst layer, and then reach a cathode catalyst in the cathode catalyst layer. Meanwhile, the electrons which are produced by oxidation of hydrogen at the same time of protons pass through the external circuit, and reach the cathode gas diffusion electrode. On the cathode catalyst in the cathode electrode layer, the protons react with oxygen of the oxidizing agent and then water is generated. At this time, electric energy is extracted.

At this time, the proton exchange membrane also needs to serve as a gas barrier by reducing gas permeability. A proton exchange membrane having high gas permeability causes cross leakage, that is, leakage of hydrogen on the anode side to the cathode side and leakage of oxygen on the cathode side to the anode side. Occurrence of the cross leakage causes the so-called chemical short, preventing extraction of good voltage. Moreover, the occurrence of the cross leakage causes the problem that hydrogen on the anode side reacts with oxygen on the cathode side to generate hydrogen peroxide, which chemically deteriorates the proton exchange membrane. In order to solve these problems, proton exchange membranes have been proposed in which chemical durability is improved by an ion exchange resin composited with an additive having an effect of suppressing production of hydrogen peroxide such as polybenzimidazole and polyphenylene sulfide (see Patent Literatures 1 and 2).

Meanwhile, from the viewpoint of reducing internal resistance of the fuel cell and further increasing the output of the fuel cell, reduction in the thickness of the proton exchange membrane serving as the electrolyte has been examined. However, the effect as the gas barrier is reduced by reduction in the thickness of the proton exchange membrane and then the problem of cross leakage becomes more serious. Further, since mechanical strength of the proton exchange membrane itself is reduced by reduction in the thickness of the proton exchange membrane, leading to physical problems. For example, the proton exchange membrane is difficult to handle in production of the membrane electrode assembly or assemble of the fuel cell and the proton exchange membrane is broken when the proton exchange membrane absorbs water generated on the cathode side to change the size of the membrane.

Then, in order to solve these problems, proton exchange membranes have been proposed in which a porous membrane is filled with an ion exchange resin (see Patent Literatures 3 to 5).

For recent demands for a longer operation time of the fuel cell, a higher temperature, and lower humidity, a membrane having both physical durability and chemical durability at the same time has been proposed in which a porous membrane is filled with an ion exchange resin composited with an additive such as polybenzimidazole and polyphenylene sulfide (see Patent Literature 6).

CITATION LIST

Patent Literature

Patent Literature 1: WO2005/000949
Patent Literature 2: WO2008/102851
Patent Literature 3: Japanese Patent Publication No. 05-75835
Patent Literature 4: Japanese Patent Publication No. 07-68377
Patent Literature 5: Japanese Patent No. 4402625
Patent Literature 6: Japanese Patent Laid-Open No. 2009-242688

SUMMARY OF INVENTION

Technical Problem

However, the proton exchange membranes disclosed in Patent Literatures 1 and 2 have long-term chemical durability but have poor mechanical strength. For this reason, these membranes are difficult to endure repeated size change and susceptible to improvement in physical durability. Moreover, the proton exchange membranes disclosed in Patent Literatures 3 to 5 all have improved physical durability, but the internal resistance of the membrane is increased by insertion of the non-conductive microporous membrane. Namely, these membranes are susceptible to improvement in power generation property.

Further, the proton exchange membrane disclosed in Patent Literature 6 is devised to meet chemical durability and physical durability at the same time. However, if the porous membrane has a smaller pore diameter, there is a problems that excessive water such as water generated by the reaction tends to stagnate inside of the electrolyte in pores and flooding easily occurs during operation of the fuel cell as well as a problem that filling of the additive such as polybenzimidazole and polyphenylene sulfide is difficult and voids are produced in the membrane. Namely, the membrane is susceptible to improvement in satisfaction of power generation properties and durability at the same time.

Then, an object of the present invention is to provide a fluorine-based polymer electrolyte membrane having high initial power generation properties, durability, and dimensional stability.

Solution to Problem

In the polymer electrolyte membrane as disclosed in Patent Literatures 3 to 6, pores of which are filled with the polymer electrolyte, the prime purpose is to suppress dimensional change of the membrane, so the pore diameter of the microporous membrane is designed to be very small. For this reason, the power generation properties are not satisfactory, as described above.

However, as a result of extensive research by the present inventors, it was found out that indeed, the effect of suppressing dimensional change of the membrane is larger as the pore diameter of the microporous membrane is smaller, but the effect of suppressing dimensional change of the membrane can be obtained even at a pore diameter not reduced to the pore diameter of the conventional microporous membrane, and the effect is enough for practical use.

The present inventors have found that a fluorine-based polymer electrolyte membrane having a high initial power generation property, suppressed dimensional change in water at 80° C., and high durability to suppress production of hydrogen peroxide or the like can be provided by using a membrane having specific pore distribution, namely, a membrane having a center of distribution in a pore diameter range of 0.3 μm to 5.0 μm, as a microporous membrane in a polymer electrolyte membrane comprising a microporous membrane and a polymer electrolyte composition which comprises a fluorine-based polymer electrolyte and is contained in a pore of the microporous membrane, and thus the present invention has been completed.

Namely, the present invention provides a fluorine-based polymer electrolyte membrane as follows.

A polymer electrolyte membrane comprising a microporous membrane and a fluorine-based polymer electrolyte contained in a pore of the microporous membrane, wherein the microporous membrane has a pore distribution with a center of distribution in a pore diameter range of 0.3 μm to 5.0 μm, and the fluorine-based polymer electrolyte composition comprises a fluorine-based polymer electrolyte (component A) having an ion exchange capacity of 0.5 to 3.0 meq/g.

Advantageous Effects of Invention

The present invention can provide a polymer electrolyte membrane having a high initial power generation property, durability, and dimensional stability.

BRIEF DESCRIPTION OF DRAWING

FIG. 1 The pore distribution curves of microporous membranes used in Examples of the present invention and Comparative Examples.

DESCRIPTION OF EMBODIMENT

Hereinafter, an embodiment for implementing the present invention (hereinafter, simply referred to as "the present embodiment") is described in detail. The present invention will not be limited to the present embodiment below, and can be modified and implemented in many ways within the scope of the gist.

The polymer electrolyte membrane according to the present embodiment is a fluorine-based polymer electrolyte membrane comprising a microporous membrane and a fluorine-based polymer electrolyte contained in a pore of the microporous membrane, wherein the microporous membrane has a specific structure and physical properties.

[Fluorine-Based Polymer Electrolyte Composition]

(Fluorine-Based Polymer Electrolyte)

The fluorine-based polymer electrolyte is a polymer electrolyte having a fluorine atom within at least one repeating unit. Specific examples thereof include perfluorocarbon polymer compounds having a structure unit represented by the following general formula (1):

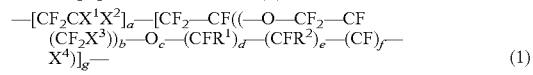

In the formula (1), $X^1$, $X^2$, and $X^3$ are each independently selected from the group consisting of halogen atoms and perfluoroalkyl groups having 1 to 3 carbon atoms. Examples of halogen atoms include a fluorine atom, a chlorine atom, a bromine atom, and an iodine atom. The fluorine atom or chlorine atom is preferable.

$X^4$ is COOZ, $SO_3Z$, $PO_3Z_2$, or $PO_3HZ$. Z is a hydrogen atom, an alkali metal atom such as a lithium atom, a sodium atom, or a potassium atom, an alkaline earth metal atom such as a calcium atom or a magnesium atom, or amines ($NH_4$, $NH_3R_1$, $NH_2R_1R_2$, $NHR_1R_2R_3$, $NR_1R_2R_3R_4$). $R_1$, $R_2$, $R_3$, and $R_4$ are each independently selected from the group consisting of alkyl groups and arene groups. In the case where $X^4$ is $PO_3Z_2$, Z may be the same or different.

The alkyl groups are not particularly limited. Examples thereof include monovalent groups represented by the formula $C_nH_{2n+1}$ (n represents an integer of 1 or more, preferably an integer of 1 to 20, and more preferably an integer of 1 to 10), and specifically include a methyl group, an ethyl group, a propyl group, a butyl group, a pentyl group, and a hexyl group. The alkyl groups may have a substituent. The arene group may also have a substituent.

$R^1$ and $R^2$ are each independently selected from the group consisting of halogen atoms, perfluoroalkyl groups having 1 to 10 carbon atoms, and fluorochloroalkyl groups having 1 to 10 carbon atoms. Examples of the halogen atoms include a fluorine atom, a chlorine atom, a bromine atom, and an iodine atom. The fluorine atom or chlorine atom is preferable.

a and g are a number satisfying $0 \leq a < 1$, $0 < g \leq 1$, and $a+g=1$.

b is an integer of 0 to 8.

c is 0 or 1.

d, e, and f are each independently an integer of 0 to 6 (wherein d, e, and f are not 0 at the same time).

In the case where in the above formula (1), Z is an alkaline earth metal, two $X^4$ may form a salt with the alkaline earth metal as $(COO)_2Z$ or $(SO_3)_2Z$, for example.

Among these, perfluorocarbon sulfonate polymers or metal salts thereof represented by the following formula (3) or (4) are particularly preferable.

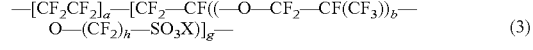

wherein a and g are a number satisfying $0 \leq a < 1$, $0 < g \leq 1$, and $a+g=1$, b is an integer of 1 to 3, h is an integer of 1 to 8, and X is a hydrogen atom or an alkali metal atom.

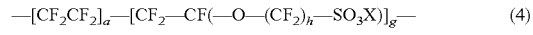

wherein a and g are a number satisfying $0 \leq a < 1$, $0 < g \leq 1$, and $a+g=1$, h is an integer of 1 to 8, and X is a hydrogen atom or an alkali metal atom.

The perfluorocarbon polymer compound having an ion exchange group and being usable in the present embodiment can be produced as follows, for example; a precursor polymer represented by the following formula (5) is polymerized, and the obtained product is subjected to alkaline hydrolysis, acid treatment, or the like.

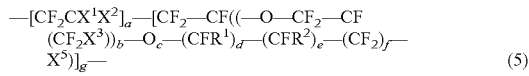

$$—[CF_2CX^1X^2]_a—[CF_2—CF((—O—CF_2—CF(CF_2X^3))_b—O_c—(CFR^1)_d—(CFR^2)_e—(CF_2)_f—X^5)]_g— \quad (5)$$

In the formula, $X^1$, $X^2$, and $X^3$ are each independently selected from the group consisting of halogen atoms and perfluoroalkyl groups having 1 to 3 carbon atoms. Examples of the halogen atoms include a fluorine atom, a chlorine atom, bromine atom, and an iodine atom. The fluorine atom or a chlorine atom is preferable.

$X^5$ is $COOR^3$, $COR^4$, or $SO_2R^4$. $R^3$ is a hydrocarbon alkyl group having 1 to 3 carbon atoms. $R^4$ is a halogen atom.

$R_1$ and $R_2$ are each independently selected from the group consisting of halogen atoms, perfluoroalkyl groups having 1 to 10 carbon atoms, and fluorochloroalkyl groups having 1 to 10 carbon atoms. Examples of the halogen atoms include a fluorine atom, a chlorine atom, a bromine atom, and an iodine atom. The fluorine atom or chlorine atom is preferable.

a and g are a number satisfying $0 \le a < 1$, $0 < g \le 1$, and $a+g=1$.

b is an integer of 0 to 8.

c is 0 or 1.

d, e, and f are each independently an integer of 0 to 6 (wherein d, e, and f are not 0 at the same time).

The precursor polymer represented by the above formula (5) can be produced, for example, by copolymerizing an olefin fluoride compound with a vinyl fluoride compound.

Here, examples of the olefin fluoride compound include compounds represented by the following formula (1a):

$$CF_2=CX^1X^2 \quad (1a)$$

wherein $X^1$ and $X^2$ are as described above in the formula (5).

Specifically, examples of the olefin fluoride compound include $CF_2=CF_2$, $CF_2=CFCl$, and $CF_2=CCl_2$.

Examples of the vinyl fluoride compound include compounds represented by the following formula (1b):

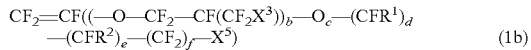

$$CF_2=CF((—O—CF_2—CF(CF_2X^3))_b—O_c—(CFR^1)_d—(CFR^2)_e—(CF_2)_f—X^5) \quad (1b)$$

wherein $X^3$, $X^5$, $R^1$, $R^2$, b, c, d, e, and f are as described above in the formula (5).

Specifically, examples of the vinyl fluoride compound include $CF_2=CFO(CF_2)_j—SO_2F$, $CF_2=CFOCF_2CF(CF_3)O(CF_2)_j—SO_2F$, $CF_2=CF(OCF_2CF(CF_3))_j—(CF_2)_{j-1}—SO_2F$, $CF_2=CFO(CF_2)_j—CO_2R$, $CF_2=CFOCF_2CF(CF_3)O(CF_2)_j—CO_2R$, $CF_2=CF(CF_2)_j—CO_2R$, $CF_2=CF(OCF_2CF(CF_3))_j—(CF_2)_2—CO_2R$ (wherein j represents an integer of 1 to 8, and R represents a hydrocarbon alkyl group having 1 to 3 carbon atoms).

Such a precursor polymer above can be synthesized by a known method. The synthesis method is not particularly limited. Examples of the method can include the followings.

(i) A method in which a polymerization solvent such as a fluorine-containing hydrocarbon is used and polymerization is conducted by having the vinyl fluoride compound and an olefin fluoride gas react in the state of being filled and dissolved in the polymerization solvent (solution polymerization). As the fluorine-containing hydrocarbon, compounds generally referred to as "fron" such as trichlorotrifluoroethane and 1,1,1,2,3,4,4,5,5,5-decafluoropentane can be suitably used.

(ii) A method in which without using any solvent such as fluorine-containing hydrocarbon, the polymerization of the vinyl fluoride compound is conducted by using the vinyl fluoride compound itself as the polymerization solvent (bulk polymerization).

(iii) A method in which an aqueous solution of a surfactant as the polymerization solvent is used and the polymerization is conducted by having the vinyl fluoride compound and an olefin fluoride gas react in the state of being filled and dissolved in the polymerization solvent (emulsion polymerization).

(iv) A method in which an aqueous solution of an interface polymerizing agent and an emulsifying aid such as alcohol is used and the polymerization is conducted by having the vinyl fluoride compound and an olefin fluoride gas react in the state of being filled and emulsified in the aqueous solution (miniemulsion polymerization, microemulsion polymerization).

(v) A method in which an aqueous solution of a suspension stabilizer is used and the polymerization is conducted by having the vinyl fluoride compound and the olefin fluoride gas react in the state of being filled and suspended in the aqueous solution (suspension polymerization).

In the present embodiment, a melt mass-flow rate (hereinafter, abbreviated to "MFR" in some cases) can be used as an index of a polymerization degree of the precursor polymer. In the present embodiment, from the viewpoint of molding and processing, the MFR of the precursor polymer is preferably 0.01 or more, more preferably 0.1 or more, and still more preferably 0.3 or more. The upper limit of the MFR is not particularly limited. From the viewpoint of molding and processing, the MFR is preferably 100 or less, more preferably 50 or less, and still more preferably 10 or less.

The precursor polymer thus produced is hydrolyzed in a basic reaction solution, sufficiently washed with hot water or the like, and subjected to an acid treatment. The hydrolysis and acid treatment protonize the perfluorocarbon sulfonate resin precursor to turn into a perfluorocarbon sulfonate resin having $SO_3H$, for example.

In the present embodiment, although the content of the fluorine-based polymer electrolyte is preferably 100% by mass based on the entire polymer used as the polymer electrolyte from the viewpoint of chemical durability, a hydrocarbon-based polymer electrolyte or the like may be contained in any proportion, for example. Examples of the hydrocarbon-based polymer electrolyte include polyphenylene sulfide, polyphenylene ether, polysulfone, polyethersulfone, polyetherethersulfone, polyetherketone, polyetheretherketone, polythioetherethersulfone, polythioetherketone, polythioetheretherketone, polybenzimidazole, polybenzoxazole, polyoxadiazole, polybenzoxazinone, polyxylylene, polyphenylene, polythiophene, polypyrrole, polyaniline, polyacene, polycyanogen, polynaphthyridine, polyphenylene sulfide sulfone, polyphenylene sulfone, polyimide, polyetherimide, polyesterimide, polyamidimide, polyarylate, aromaticpolyamide, polystyrene, polyester, and polycarbonate. The content of the hydrocarbon-based polymer electrolyte is preferably 50% by mass or less, and more preferably 20% by mass or less based on the entire polymer electrolyte.

The fluorine-based polymer electrolyte in the present embodiment has an ion exchange capacity of 0.5 to 3.0 meq/g. To satisfy the condition, the fluorine-based polymer electrolyte has an ion exchange group. At an ion exchange capacity of 3.0 meq/g or less, swelling of the polymer electrolyte membrane containing the polymer electrolyte under a high temperature and high humidifying during operation of the fuel cell tends to be reduced. The reduction in swelling of the polymer electrolyte membrane can improve problems such as reduction in the strength of the polymer electrolyte membrane, peel off of the membrane from the electrode caused by wrinkles produced in the membrane, and reduction in the gas shielding properties. Meanwhile, at an ion exchange capacity of 0.5 meq/g or more, the fuel cell including the polymer electrolyte membrane satisfying such a condition can keep the power generation ability well. From these viewpoints, the ion exchange capacity of the fluorine-based polymer electrolyte (component A) is more preferably 0.65 meq/g or more, and still more preferably 1.3 meq/g or more from the viewpoint of keeping the power generation ability. From the viewpoint of reduction in swelling, the ion exchange capacity is more preferably 2.8 meq/g or less, and still more preferably 2.5 meq/g or less.

The ion exchange capacity of the fluorine-based polymer electrolyte in the present embodiment is measured as follows.

First, a membrane comprising the polymer electrolyte in which the counter ion of the ion exchange group is in the state of proton is immersed in a 25° C. saturated NaCl aqueous solution. The aqueous solution is stirred for a sufficient time. Next, the protons in the saturated NaCl aqueous solution are neutralized and titrated with a 0.01 N sodium hydroxide aqueous solution. After neutralization and filtration, the obtained membrane comprising the polymer electrolyte in which the counter ion of the ion exchange group is in the state of sodium ion is washed with pure water, and vacuum dried. Then, the membrane is weighed. An equivalent mass EW (g/equivalent) is determined from the following equation wherein M (mmol) is the amount of sodium hydroxide needed for neutralization, and W (mg) is the mass of the membrane comprising the polymer electrolyte in which the counter ion of the ion exchange group is sodium ion:

$$EW=(W/M)-22$$

Further, the ion exchange capacity (meq/g) is calculated by multiplying the inverse of the obtained EW value with 1000.

Accordingly, the fluorine-based polymer electrolyte in the present embodiment has an equivalent weight (EW) value of preferably 330 to 2000 g/equivalent, more preferably 355 to 1540 g/equivalent, and still more preferably 400 to 770 g/equivalent.

The ion exchange capacity can be controlled to fall within the above-mentioned numeral range by adjusting the number of the ion exchange group present in 1 g of the fluorine-based polymer electrolyte membrane.

In the fluorine-based polymer electrolyte composition according to the present embodiment, the glass transition temperature is preferably 80° C. or more, more preferably 100° C. or more, and more preferably 120° C. or more, and particularly preferably 130° C. or more from the viewpoint of heat resistance during operation of the fuel cell. Here, the glass transition temperature of the polymer electrolyte is measured according to JIS-C-6481. Specifically, the polymer electrolyte formed into a membrane is cut out at a width of 5 mm. The temperature of a test piece is raised from room temperature at a rate of 2° C./min and the dynamic viscoelasticity and loss tangent of the test piece are measured with using a dynamic rheometer. The peak temperature of the measured loss tangent was defined as the glass transition temperature. The glass transition temperature can be adjusted by controlling the structural formula, the molecular weight, the ion exchange capacity, and the like of the polymer electrolyte contained in the fluorine-based polymer electrolyte composition.

In the polymer electrolyte membrane according to the present embodiment, the moisture content at 80° C. is preferably 5% by mass to 150% by mass, more preferably 10% by mass to 100% by mass, still more preferably 20% by mass to 80% by mass, and particularly preferably 30% by mass to 70% by mass. When the moisture content of the polymer electrolyte is controlled within the above-mentioned range, effects such as long-term dimensional change stability and high battery performance even under a high temperature and low humidifying condition are obtained. At a moisture content at 80° C. of 5% by mass or more, enough water for movement of the protons exists and high battery performance is attained when the membrane is used for the fuel cell. Meanwhile, at a moisture content at 80° C. of 150% by mass or less, possibility of gelation of the polymer electrolyte is small and the polymer electrolyte can be molded into a membrane.

The moisture content at 80° C. of the polymer electrolyte membrane can be adjusted by controlling the molecular weight, MFR, crystallization degree, and ion exchange capacity of the polymer electrolyte, the area of the hydrophilic treated surface of the microporous membrane, the heat treatment temperature and time of the polymer electrolyte membrane, and the like. Examples of a method for increasing the moisture content at 80° C. include increase in the density of the ion exchange group in the polymer electrolyte, increase in the MFR of the polymer electrolyte precursor polymer, decrease in the heat treatment temperature or heat treatment time to suppress crystallization of the polymer electrolyte, and modification of the surface of the microporous membrane with a hydrophilic group. Meanwhile, examples of a method for reducing the moisture content at 80° C. include decrease in the density of the ion exchange group in the polymer electrolyte, reduction in the MFR of the polymer electrolyte precursor polymer, and crosslinking of the polymer electrolyte membrane with an electron beam or the like.

In addition to the polymer electrolyte above, the polymer electrolyte membrane according to the present embodiment may contain additives such as a compound having an azole ring and a compound having a thioether group for improvement in durability. These additives are used alone or in combination with two or more thereof.

(Compound Having Thioether Group)

The compound having a thioether group usable in the present embodiment is a compound having a chemical structure —(R—S)$_r$— (S is a sulfur atom, R is a hydrocarbon group, r is an integer of 1 or more). Examples of such a compound having a chemical structure specifically include dialkyl thioethers such as dimethyl thioether, diethyl thioether, dipropyl thioether, methyl ethyl thioether, methylbutylthioether; cyclic thioethers such as tetrahydrothiophene and tetrahydrothiapyran; and aromatic thioethers such as methyl phenyl sulfide, ethyl phenyl sulfide, diphenyl sulfide, and dibenzyl sulfide. Those exemplified here may be used as it is as the compound having a thioether group or may be a monomer to obtain a polymer used as the compound having a thioether group such as polyphenylene sulfide (PPS), for example.

By adding the compound having a thioether group, chemical degradation of the polymer electrolyte membrane can be suppressed. For this reason, for example, high durability can be attained even under a high temperature and low humidifying condition (such as an operating temperature of 100° C. and humidifying at 50° C. (equivalent to humidity of 12 RH %)).

From the viewpoint of durability, the compound having a thioether group is preferably a polymer (oligomer, polymer) wherein r is 10 or more, and more preferably a polymer wherein r is 1,000 or more. A particularly preferable compound having a thioether group is polyphenylene sulfide (PPS).

Here, polyphenylene sulfide will be described. Examples of polyphenylene sulfide usable in the present embodiment include polyphenylene sulfides having preferably 70 mol % or more, more preferably 90 mol % or more of a para-phenylene sulfide skeleton.

The method of producing the above-mentioned polyphenylene sulfide is not particularly limited. Examples of the method include a method of polymerizing a halogen-substituted aromatic compound (such as p-dichlorobenzene) in the presence of sulfur and sodium carbonate; a method of polymerizing a halogen-substituted aromatic compound in a polar solvent in the presence of sodium sulfide or sodium hydrogen sulfide and sodium hydroxide; a method of polymerizing a halogen-substituted aromatic compound in a polar solvent in the presence of hydrogen sulfide and sodium hydroxide or sodium aminoalkanoate; or a method of self condensation of p-chlorothiophenol. Among these, a method of reacting sodium sulfide with p-dichlorobenzene in an amide solvent such as N-methylpyrrolidone and dimethylacetamide or a sulfone solvent such as sulfolane is suitably used.

The content of a —SX group in the polyphenylene sulfide (S is a sulfur atom, X is an alkali metal atom or a hydrogen atom) is usually preferably 10 µmol/g to 10,000 µmol/g, more preferably 15 µmol/g to 10,000 µmol/g, and still more preferably 20 µmol/g to 10,000 µmol/g.

The content of the —SX group within the range above means that many reaction active sites exist. By use of the polyphenylene sulfide having the —SX group whose content is within the range above, it seems that compatibility with the polymer electrolyte according to the present embodiment is improved, and following this, the dispersibility is also improved; as a result, higher durability is obtained under a high temperature and low humidifying condition.

As the compound having a thioether group, those having an acidic functional group introduced into a terminal thereof can also be used suitably. As the introduced acidic functional group, those selected from the group consisting of a sulfonic acid group, a phosphoric acid group, a carboxylic acid group, a maleic acid group, a maleic anhydride group, a fumaric acid group, an itaconic acid group, an acrylic acid group, a methacrylic acid group are preferable, and the sulfonic acid group is particularly preferable.

The method for introducing the acidic functional group is not particularly limited, and an ordinary method is used. For example, in the case where a sulfonic acid group is introduced into the compound having a thioether group, the introduction can be performed on the known condition using a sulfonating agent such as sulphuric anhydride and fuming sulfuric acid. More specifically, introduction can be performed on the condition described in, for example, K. Hu, T. Xu, W. Yang, Y. Fu, Journal of Applied Polymer Science, Vol. 91, and E. Montoneri, Journal of Polymer Science: Part A: Polymer Chemistry, Vol. 27, 3043-3051 (1989).

Moreover, those in which the above-mentioned introduced acidic functional group is further replaced by a metal salt or amine salt are suitably used as the compound having a thioether group. As the metal salt, alkali metal salts such as sodium salt and potassium salt, and alkaline earth metal salts such as calcium salt are preferable.

Further, in the case where a powdery compound having a thioether group is used, the average particle size of the compound having a thioether group is preferably 0.01 µm to 2.0 µm, more preferably 0.01 µm to 1.0 µm, still more preferably 0.01 µm to 0.5 µm, and particularly preferably 0.01 µm to 0.1 µm from the viewpoint of improving the dispersibility in the polymer electrolyte to attain the effect such as longer life well. The average particle size is a value measured by a laser diffraction/scattering particle size distribution analyzer (for example, made by HORIBA, Ltd., type: LA-950).

Examples of a method for finely dispersing the compound having a thioether group in the polymer electrolyte include a method in which a high shear force is applied to grind and finely disperse the compound having a thioether group in melt kneading with the polymer electrolyte or the like; and a method in which a polymer electrolyte solution described later is obtained, the solution is then filtered to remove a coarse compound having a thioether group particle, and the solution after filtration is used. The melt viscosity of the polyphenylene sulfide suitably used in melt kneading is preferably 1 to 10,000 poise, and more preferably 100 to 10,000 poise from the viewpoint of moldability and processability. The melt viscosity is a value obtained by using a Flowtester and keeping a sample at 300° C. and a load of 196 N, L/D (L: orifice length, D: orifice inner diameter)=10/1 for 6 minutes.

The ratio (Wa/Wd) of the mass (Wa) of the polymer electrolyte (total mass of the polymer electrolyte contained in the polymer electrolyte membrane) to the mass (Wd) of the compound having a thioether group is preferably 60/40 to 99.99/0.01, more preferably 70/30 to 99.95/0.05, still more preferably 80/20 to 99.9/0.1, and particularly preferably 90/10 to 99.5/0.5. At a mass ratio of the polymer electrolyte of 60 or more, better ion conductivity can be attained, leading to better battery properties. Meanwhile, at a mass ratio of the compound having a thioether group of 40 or less, the durability during operation of the fuel cell on a high temperature and low humidifying condition can be improved.

(Compound Having Azole Ring)

Examples of the compound having an azole ring usable in the present embodiment include polymers of compounds comprising a heterocyclic 5-member ring having one or more nitrogen atoms in the ring, such as polyimidazole compounds, polybenzimidazole compounds, polybenzobisimidazole compounds, polybenzoxazole compounds, polyoxazole compounds, polythiazole compounds, and polybenzothiazole compounds. The heterocyclic 5-member ring may contain an oxygen atom, a sulfur atom, or the like other than the nitrogen atom.

By adding the compound having an azole ring, not only chemical degradation caused by hydrogen peroxide or the like can be suppressed, but also the mechanical strength of the polymer electrolyte membrane can be improved by adding an additive having relatively high rigidity such as polyazole. For such effects obtained, the physical durability of the polymer electrolyte membrane tends to be further improved.

The molecular weight of the compound having an azole ring is preferably 300 to 500,000 (in terms of polystyrene) as the weight average molecular weight when GPC measurement is performed.

As the compound comprising the heterocyclic 5-member ring, for example, a compound having a heterocyclic 5-member ring attached to a divalent aromatic group such as a p-phenylene group, an m-phenylene group, a naphthalene group, a diphenylene ether group, a diphenylene sulfone group, a biphenylene group, a terphenyl group, and a 2,2-bis(4-carboxyphenylene)hexafluoropropane group is preferably used from the viewpoint of obtaining heat resistance. Specifically, as the compound having an azole ring, polybenzimidazole is preferably used.

The compound having an azole ring may be a compound to which an ion exchange group is introduced using an ordinary modifying method below (modified polyazole compound). Examples of such a modified polyazole compound include those in which one or more groups selected from the group consisting of an amino group, a quaternary ammonium group, a carboxyl group, a sulfonic acid group, and a phosphonic acid group are introduced into the compound having an azole ring. The introduction of an anionic ion exchange group into the compound having an azole ring is useful since it can enhance the ion exchange capacity of the entire polymer electrolyte membrane according to the present embodiment and results in availability of a high output during operation of the fuel cell. The ion exchange capacity of the modified polyazole compound is preferably 0.1 to 3.5 meq/g.

The method for modifying the compound having an azole ring is not particularly limited. Examples of the method include a method in which an ion exchange group is introduced into the compound having an azole ring by using fuming sulfuric acid, concentrated sulfuric acid, sulphuric anhydride and complexes thereof, sultones such as propane sultone, α-bromotoluenesulfonic acid, chloroalkylsulfonic acid, or the like; and a method in which an ion exchange group is contained in synthesis of the monomer of the compound having an azole ring and polymerization is performed.

Suitably, the compound having an azole ring is dispersed in the state of islands in the phase of the polymer electrolyte. Here, "dispersed in the state of islands" means that the phase containing the compound having an azole ring is dispersed in the state of particles in the phase of the polymer electrolyte when the polymer electrolyte is observed with a TEM without staining. Dispersion in such state means that the portions containing the compound having an azole ring are uniformly finely dispersed in the portion mainly containing the polymer electrolyte, and is preferable from the viewpoint of durability.

Further, the polymer electrolyte and the compound having an azole ring may be in the state of being ionically bonded and forming an ion complex of an acid and a base, or may be in the state of being covalently bonded, for example. Namely, for example, in the case where the polymer electrolyte has a sulfonic acid group and the compound having an azole ring has a reaction group such as an imidazole group, an oxazole group, and a thiazole group, the sulfonic acid group in the polymer electrolyte and the nitrogen atom of each reaction group in the compound having an azole ring may be ionically or covalently bonded to each other.

Using a Fourier-Transform Infrared Spectrometer (hereinafter, referred to as an FT-IR), it can be checked whether the ionic bond or covalent bond exists or not. For example, in the case where a perfluorocarbon sulfonate resin is used as the polymer electrolyte and poly[2,2' (m-phenylene)-5,5'-benzimidazole](hereinafter, referred to as "PBI") is used as the compound having an azole ring, the measurement using the FT-IR shows that shifted absorption peaks derived from the chemical bond between the sulfonic acid group in the polymer electrolyte and an imidazole group in PBI exist around 1458 $cm^{-1}$, 1567 $cm^{-1}$, and 1634 $cm^{-1}$.

Further, when PBI is added to produce the polymer electrolyte membrane as the compound having an azole ring and the obtained membrane is subjected to a dynamic viscoelasticity test, the peak temperature (Tg) of the loss tangent (Tan δ) obtained by raising the temperature from room temperature to 200° C. is higher than the peak temperature of the polymer electrolyte membrane to which PBI is not added. Such increase of the Tg is preferable because the heat resistance and mechanical strength of the polymer electrolyte membrane can be improved.

The ratio (Wc/Wd) of the mass (Wc) of the compound having an azole ring to the mass (Wd) of the compound having a thioether group is preferably 1/99 to 99/1. Further, from the viewpoint of the balance between chemical stability and durability (dispersibility), Wc/Wd is more preferably 5/95 to 95/5, still more preferably 10/90 to 90/10, and particularly preferably 20/80 to 80/20.

Further, the proportion of the total mass of the compound having an azole ring and the compound having a thioether group in the polymer electrolyte membrane is preferably 0.01% by mass to 50% by mass. From the viewpoint of balance between ion conductivity and durability (dispersibility), the total mass is more preferably 0.05% by mass to 45% by mass, still more preferably 0.1% by mass to 40% by mass, further still more preferably 0.2% by mass to 35% by mass, and particularly preferably 0.3% by mass to 30% by mass.

[Microporous Membrane]

Raw materials for the microporous membrane according to the present embodiment are not limited. For example, polytetrafluoroethylene, polyamide, polyimide, polyolefin, polycarbonate, or the like may be used singly or in the form of a mixture thereof and polytetrafluoroethylene (PTFE) is preferable from the viewpoint of the chemical durability of the polymer electrolyte.

The method of producing the PTFE microporous membrane preferably used in the present embodiment is not particularly limited. From the viewpoint of suppressing dimensional change of the polymer electrolyte membrane, a stretch PTFE microporous membrane is preferable. The stretch PTFE microporous membrane can be produced by a known method such as methods disclosed in Japanese Patent Laid-Open No. 51-30277, National Publication of International Patent Application No. 1989-01876, and Japanese Patent Laid-Open No. 10-30031. Specifically, first, a liquid lubricant such as solvent naphtha and white oil is added to the fine power which is obtained by coagulating a PTFE emulsion polymerizable aqueous dispersion liquid and the obtained paste is extruded into a bar shape. Then, the bar-shaped paste extruded product (cake) is rolled to obtain a PTFE non-burned body. The non-burned tape at this time is stretched in the longitudinal direction (MD direction) and/or in the transverse direction (TD direction) at arbitary draw ratio. During stretch or after stretch, the liquid lubricant filled in the extrusion is removed by heating or extraction. Thereby, a stretch PTFE microporous membrane can be obtained.

In the present embodiment, when necessary, the microporous membrane may contain known additives such as a non-fibrous product (such as low molecular weight PTFE), an ultraviolet absorbing agent, a light stabilizer, an antistatic agent, an anti-fogging agent, and a coloring pigment in the range in which achievement of the object of the present invention is not obstructed and the effects are not impaired.

The microporous membrane in the present embodiment has a feature that the microporous membrane has a pore distribution with a maximum (peak) of distribution in a pore diameter range of 0.3 µm to 5.0 µm.

Here, the pore distribution of the microporous membrane refers to a value measured by a half dry/bubble point method using a bubble point method described in JIS-K-3832.

Here, if a center of distribution of the pore diameter is 0.3 µm or more, processability tends to be higher, because additives having a hydrogen peroxide suppressing effect or the like and the electrolyte solution are easily filled, production of voids in the polymer electrolyte membrane can be suppressed and a sufficient filling rate of the fluorine-based polymer electrolyte composition can be ensured. If the center of distribution of the pore diameter is 5.0 µm or less, dimensional change of the polymer electrolyte membrane can be suppressed, and an effect of reinforcing the membrane tends to be obtained sufficiently.

From the viewpoint of the initial power generation property, the center of distribution in the pore distribution of the microporous membrane is preferably 0.4 µm or more, more preferably 0.5 µm or more, still more preferably 0.6 µm or more, and particularly preferably 0.7 µm or more. From the viewpoint of the effect of reinforcing the membrane, the center of distribution in the pore distribution of the microporous membrane is preferably 4.5 µm or less, more preferably 4.0 µm or less, still more preferably 3.5 µm or less, and particularly preferably 3.0 µm or less.

In the pore distribution of the microporous membrane in the present embodiment, the abundance of pores having a pore diameter of 0.3 µm to 5.0 µm in the microporous membrane is preferably 0.5 or more (numeric amount ratio) Here, "the abundance of pores" in the microporous membrane refers to the ratio of the number of pores in a pore diameter range of 0.3 µm to 5.0 µm to the total number of pores in the microporous membrane, as measured at the measurement pore ranging from 0.065 µm to 10.0 µm according to the half dry/bubble point method using the bubble point method described in JIS-K-3832.

If adjustment is made such that the abundance of pores having a pore diameter of 0.3 µm to 5.0 µm in the microporous membrane is 0.5 or more (numeric amount ratio), the microporous membrane has a relatively uniform pore diameter and pores in the microporous membrane are easily filled with the electrolyte uniformly. As a result, in the case where the fluorine-based polymer electrolyte composition contains the additive, the additive can be uniformly dispersed in the membrane. For this reason, voids are difficult to produce in the membrane. Further, the polymer electrolyte membrane tends to attain high chemical durability. In the case where the additive has no proton-conductivity, it can be adjusted to prevent the pores in the microporous membrane from being clogged with the additive, by making the pore diameter of the microporous membrane substantially equal to or more than the median diameter of the additive. This shows that as a result, the protons in the membrane tend to smoothly conduct without any inhibition. Thereby, a high effect such as improvement in the initial properties of the polymer electrolyte membrane can be obtained.

In the present embodiment, the abundance of pores in the microporous membrane is more preferably 0.7 or more, still more preferably 0.8 or more, further still more preferably 0.9 or more, and especially preferably 1.

Moreover, the abundance of pores in the microporous membrane at a pore diameter of 0.5 µm to 5.0 µm (numeric amount ratio) is preferably 0.5 or more, more preferably 0.7 or more, still more preferably 0.8 or more, further still more preferably 0.9 or more, and especially preferably 1.

Moreover, the abundance of pores in the microporous membrane at a pore diameter of 0.7 µm to 5.0 µm (numeric amount ratio) is preferably 0.5 or more, more preferably 0.7 or more, still more preferably 0.8 or more, further still more preferably 0.9 or more, and especially preferably 1.

In the microporous membrane in the present embodiment, the pore distribution preferably has at least two maxima of distribution. If the pore distribution of the microporous membrane has two maxima of distribution, the pores at different maxima play two different roles: (i) a pore having a pore diameter in the vicinity of a larger center of distribution promotes discharge of the reaction generated water and facilitates filling of the additive, and (ii) a pore having a pore diameter in the vicinity of a smaller center of distribution suppresses swelling of the volume of the electrolyte by mechanical strength of the microporous membrane. For this reason, the polymer electrolyte membrane using the microporous membrane tends to easily meet chemical durability and physical durability at the same time.

The numeric value of the pore diameter of the microporous membrane can be controlled to fall within the range above by controlling the kind of lubricant used in production, the dispersibility of the lubricant, the draw ratio of the microporous membrane, a solvent used to extract the lubricant, the heat treatment temperature, the heat treatment time, the extraction time, and the extraction temperature.

The microporous membrane in the present embodiment may be a single layer, or a multi layer when necessary. The multi layer is preferable because defects such as voids and pinholes are not spread even if the defects are produced in one single layer. Meanwhile, the single layer is preferable from the viewpoint of filling properties of the electrolyte and the additives. Examples of a method of producing a multilayer microporous membrane include a method of bonding two or more single layers by heat lamination and a method of layering several cakes and rolling the cakes.

In the microporous membrane according to the present embodiment, at least one of moduli in the mechanical direction (MD) and the traverse direction (TD) in production is preferably 1000 MPa or less, more preferably 500 MPa or less, and still more preferably 250 MPa or less. At a modulus of the microporous membrane of 1000 MPa or less, the dimensional stability of the polymer electrolyte membrane is improved. Here, the modulus of the microporous membrane refers to the value measured according to JIS-K7113.

Conduction of the protons in the fluorine-based polymer electrolyte is enabled when the fluorine-based polymer electrolyte absorbs water and the ion exchange group is hydrated. Accordingly, conductivity at the same humidity is higher as the density of the ion exchange group is larger and the ion exchange capacity is larger. The conductivity is higher as the humidity is higher.

In the case where the density of the sulfone group is larger, the fluorine-based polymer electrolyte in the present embodiment shows higher conductivity under a low humidity, but extremely absorbs water under a higher humidity.

For example, in the operation of a home fuel cell, the fuel cell is usually started and stopped once or more a day. The polymer electrolyte membrane repeatedly swells and shrinks by change in humidity at this time. Such repeated dry and wet dimensional change in the polymer electrolyte membrane is a demerit in both of performance and durability. In the case where the ion exchange capacity is larger, the fluorine-based polymer electrolyte in the present embodiment easily absorbs water, so dry and wet dimensional change is large if the membrane is formed as it is. However, by use of the microporous membrane having a modulus of 1000 MPa or less, the stress caused by change in the volume of the membrane can be relaxed by the microporous membrane and the dimensional change can be suppressed. Meanwhile, if the modulus of the microporous membrane is excessively small, strength of the membrane tends to be reduced.

Accordingly, the modulus of the microporous membrane is preferably 1 to 1000 MPa, more preferably 10 to 800 MPa, and particularly preferably 100 to 500 MPa.

In the microporous membrane according to the present embodiment, the porosity is preferably 50% to 90%, more preferably 60% to 90%, still more preferably 60% to 85%, and particularly preferably 50% to 85%. At a porosity within the range of 50% to 90%, improvement in the ionic conductivity of the polymer electrolyte membrane, improvement in the strength of the polymer electrolyte membrane, and suppression of the dimensional change tend to be met at the same time. Here, the porosity of the microporous membrane refers to a value measured by mercury porosimetry using a mercury porosimeter (for example, made by SHIMADZU Corporation, trade name: AutoPore IV 9520, initial pressure of approximately 20 kPa).

The numeric value of the porosity of the microporous membrane can be controlled to fall within the range above by controlling the number of pores in the microporous membrane, the pore diameter, the shape of the pore, the draw ratio, the amount of the liquid lubricant to be added, and the kind of the liquid lubricant. Examples of a method for increasing the porosity of the microporous membrane include a method for adjusting the amount of the liquid lubricant to be added to 5 to 50% by mass. By adjusting the amount of the liquid lubricant to be added within the range, the moldability of the resin that forms the microporous membrane is kept and a plasticizing effect is sufficiently obtained. For this reason, the fibers of the resin that forms the microporous membrane can be highly formed into fibril in a twin axis direction, and the draw ratio can be increased efficiently. Conversely, examples of a method for reducing the porosity include reduction in the amount of the liquid lubricant, and reduction in the draw ratio.

In the microporous membrane in the present embodiment, the film thickness is preferably 0.1 µm to 50 µm, more preferably 0.5 µm to 30 µm, still more preferably 1.0 µm to 20 µm, and particularly preferably 2.0 µm to 20 µm. At a film thickness within the range of 0.1 µm to 50 µm, the pores in the microporous membrane can be filled with the polymer electrolyte, and the dimensional change of the polymer electrolyte tends to be suppressed. Here, the film thickness of the microporous membrane refers to a value obtained by sufficiently leaving the membrane as it is in a constant temperature and humidity chamber at 50% RH, and measuring the membrane using a known film thickness gauge (for example, made by Toyo Seiki Seisaku-sho, Ltd., trade name "B-1").

The numeric value of the film thickness of the microporous membrane can be controlled within the range above by controlling the amount of the solid content in a cast solution, the amount of the resin to be extruded, the extrusion rate, and the draw ratio of the microporous membrane.

Further, in the microporous membrane according to the present invention, to suppress the dry and wet dimensional change in the polymer electrolyte membrane and keep the strength of the membrane, preferably, the absolute strength determined considering the modulus of the microporous membrane and the film thickness is high.

The absolute strength here is determined by the following expression:

$$\text{absolute strength (N/cm)} = \text{modulus of the membrane (MPa)} \times \text{thickness (µm)} \times 10^{-2}$$

The absolute strength is preferably 0.1 to 120 N/cm, preferably 1 to 100 N/cm, and most preferably 10 to 80 N/cm.

Further, the microporous membrane in the present embodiment is preferably subjected to thermal setting to reduce shrinkage. By performing the thermal setting, shrinkage of the microporous membrane under a high temperature atmosphere can be reduced, and the dimensional change of the polymer electrolyte membrane can be reduced. The thermal setting is performed on the microporous membrane by a TD (transverse direction) tenter, for example, by relaxing the stress in the TD (transverse direction) direction at a temperature in the range of the melting point of the microporous membrane raw material or less. In the case of the PTFE preferably used in the present embodiment, a preferable stress relaxation temperature is within the range of 200° C. to 420° C.

The microporous membrane in the present embodiment may be subjected to a surface treatment such as application of a surfactant and chemical reforming when necessary in the range in which achievement of the object of the present invention is not obstructed and the effects are not impaired. By the surface treatment, the surface of the microporous membrane can be hydrophilic to attain an effect of high filling properties of the polymer electrolyte solution, and the moisture content of the polymer electrolyte membrane can be controlled.

[Polymer Electrolyte Membrane]

The polymer electrolyte membrane according to the present embodiment can be obtained by filling the fluorine-based polymer electrolyte composition into the pores in the microporous membrane.

In the present embodiment, the film thickness of the polymer electrolyte membrane is preferably 1 µm to 500 µm, more preferably 2 µm to 100 µm, still more preferably 5 µm to 50 µm, and particularly preferably 5 µm to 35 µm. Control of the film thickness within the range above is preferable because inconvenient such as a direct reaction between hydrogen and oxygen can be reduced, and the membrane is difficult to damage even if a differential pressure, strain, or the like is produced in handling during production of the fuel cell or during operation of the fuel cell. Further, control of the film thickness within the range above is also preferable because the ion permeability of the polymer electrolyte membrane is kept, and the performance as the solid polymer electrolyte membrane is kept.

In the present embodiment, the dimensional change in a plane direction of the polymer electrolyte membrane in 80° C. water is preferably 15% or less, more preferably 13% or less, and still more preferably 11% or less.

Here, the dimensional change in a plane direction of the polymer electrolyte membrane in 80° C. water in the present embodiment is measured as follows.

The membrane sample was cut into a rectangle of 4 cm×3 cm, and left as it was in a constant temperature and humidity chamber (23° C., 50% RH) for 1 hour or more. Then, the lengths in the plane direction of the dried rectangular membrane sample were measured. Next, the rectangular membrane sample whose lengths were measured was boiled in hot water of 80° C. for 1 hour to sufficiently absorb water to become wet such that change in the mass of the electrolyte membrane by moisture was 5% or less (such that swelling of the volume by absorption of water reached to the saturation). At this time, the membrane was extracted from hot water, and the moisture on the surface was sufficiently removed. In this state, the membrane was measured using an electric balance, and it was found that the amount of change in the mass was 5% or less. The swelling and wet membrane sample that absorbed water was extracted from hot water, and each lengths in the plane direction (mechanical (MD) direction, traverse (TD) direction) were measured. Using each lengths in the plane direction of the dry sample as the reference, the average of the amount of increase from each lengths in the plane direction of the dry sample to the lengths in the plane direction of the wet sample (MD direction and TD direction) was defined as the dimensional change in the plane direction (%).

The dimensional change in the plane direction can be controlled within the range above by controlling the structure, modulus, and film thickness of the microporous membrane, the EW of the fluorine-based polymer electrolyte, the heat treatment temperature of the polymer electrolyte membrane, and the like.

[Method of Producing Polymer Electrolyte Membrane]

Next, a method of producing a polymer electrolyte membrane according to the present embodiment is described. The polymer electrolyte membrane according to the present embodiment can be obtained by filling the micropores in the microporous membrane with the fluorine-based polymer electrolyte composition.

The method for filling the pores in the microporous membrane with the fluorine-based polymer electrolyte composition is not particularly limited. Examples of the method include a method of applying a polymer electrolyte solution described later to the microporous membrane, and a method of immersing the microporous membrane in a polymer electrolyte solution and drying the microporous membrane. Examples of the method include the following method. A coating film of a polymer electrolyte solution is formed on an elongate casting base material (sheet) which is traveling or disposed as it is. With the solution, the elongate microporous membrane is brought into contact and an uncompleted composite structure is produced. The uncompleted composite structure is dried in a hot air circulation tank or the like. Next, another coating film of the polymer electrolyte solution is formed on the dried uncompleted composite structure and then a polymer electrolyte membrane is produced. The contact of the microporous membrane with the polymer electrolyte solution may be established in a dry state, a non-dry state, or a wet state. Moreover, the contact may be established by press bonding with a rubber roller, or established while controlling the tension of the microporous membrane. Further, the fluorine-based polymer electrolyte composition may be filled into the micropores in the microporous membrane by a method in which a sheet which contains the polymer electrolyte and is molded in advance by extrusion molding, cast molding, or the like and the microporous membrane are layered and heat pressed.

Further, in order to improve the conductivity and mechanical strength of the polymer electrolyte membrane, one or more layers containing the polymer electrolyte may be laminated on at least one main surface of the thus-produced polymer electrolyte membrane. Moreover, in the polymer electrolyte membrane according to the present embodiment, using a crosslinking agent, an ultraviolet light, an electron beam, radiation, or the like, compounds contained therein may be crosslinked with each other.

Preferably, the polymer electrolyte membrane according to the present embodiment, which is produced as above, may be further subjected to a heat treatment. By the heat treatment, crystal portions and a solid polymer electrolyte portion in the polymer electrolyte membrane are bonded strongly. As a result, mechanical strength can be stabilized. The heat treatment temperature is preferably 100° C. to 230° C., more preferably 110° C. to 230° C., and still more preferably 120° C. to 200° C. By controlling the heat treatment temperature within the range above, an adhesion force between the crystal portions and the electrolyte composition portion tends to be improved. The temperature range above is also suitable from the viewpoint of keeping high moisture content and mechanical strength of the polymer electrolyte membrane. Depending on the heat treatment temperature, the heat treatment time is preferably 5 minutes to 3 hours, and more preferably 10 minutes to 2 hours from the viewpoint of obtaining a polymer electrolyte membrane having high durability.

(Polymer Electrolyte Solution)

The polymer electrolyte solution usable in production of the polymer electrolyte membrane according to the present embodiment contains the fluorine-based polymer electrolyte, a solvent, and when necessary, other additives. The polymer electrolyte solution is used as it is or after the polymer electrolyte solution undergoes steps such as filtration and condensation, as a filling solution for the PTFE microporous membrane. Alternatively, the solution can be used alone, or mixed with other electrolyte solution and used.

A method of producing the polymer electrolyte solution will be described below. The method of producing the polymer electrolyte solution is not particularly limited. Examples thereof include a method in which the polymer electrolyte is dissolved or dispersed in a solvent to obtain a solution or, when necessary, an additive is further dispersed in the obtained solution. Alternatively, the polymer electrolyte solution is produced by a method in which the polymer electrolyte and the additive are mixed by molting and extruding the polymer electrolyte and conducting a step such as stretching, and then the obtained mixture is dissolved or dispersed in a solvent.

More specifically, first, a molded product comprising a precursor polymer of the polymer electrolyte is immersed into a basic reaction solution and hydrolyzed. By the hydrolysis, the precursor polymer of the polymer electrolyte is converted into the polymer electrolyte. Next, the hydrolyzed molded product is sufficiently washed with hot water or the like, and then subjected to an acid treatment. The acid used for the acid treatment is not particularly limited. Mineral acids such as hydrochloric acid, sulfuric acid, and nitric acid, and organic acids such as oxalic acid, acetic acid, formic acid, trifluoroacetic acid are preferable. By the acid treatment, the precursor polymer of the polymer electrolyte is protonized to obtain a polymer electrolyte such as a perfluorocarbon sulfonate resin.

The molded product subjected to the acid treatment as above (molded product containing the polymer electrolyte) is dissolved or suspended in a solvent that can dissolve or suspend the polymer electrolyte (solvent having good affinity with the resin). Examples of such a solvent include water; protic organic solvents such as ethanol, methanol, n-propanol, isopropyl alcohol, butanol, and glycerol; and aprotic organic solvents such as N,N-dimethylformamide, N,N-dimethylacetamide, and N-methylpyrrolidone. These are used alone or in combination with two or more thereof. Particularly, in the case where one solvent is used, the solvent is preferably water. In the case where the solvents are used in combination with two or more thereof, a mixed solvent of water and a protic organic solvent is preferable.

The method of dissolving or suspending the polymer electrolyte in the solvent is not particularly limited. For example, the polymer electrolyte may be dissolved or dispersed in the solvent as it is. Preferably, the polymer electrolyte is dissolved or dispersed in the solvent under an atmospheric pressure or under an air-tight, pressurized condition provided using an autoclave or the like at a temperature ranging from 0 to 250° C. Particularly, in the case where water and the protic organic solvent are used as the solvent, the mixing ratio of water to the protic organic solvent can be properly selected according to the dissolving method, the dissolving condition, the kind of the polymer electrolyte, the concentration of the total solid content, the dissolving temperature, the stirring rate, and the like. The mass ratio of the protic organic solvent to water is preferably 0.1 to 10:1, and more preferably 0.1 to 5:1.

The polymer electrolyte solution contains one or two or more of an emulsion (liquid particles are dispersed in a liquid as colloid particles or particles larger than the colloid particles and emulsified), a suspension (solid particles are dispersed in a liquid as colloid particles or particles that can be seen with a microscope), a colloidal liquid (macromolecules are dispersed), a micellar liquid (lyophilic colloid dispersion system formed of many small molecules associated with an intermolecular force), and the like.

Moreover, the polymer electrolyte solution can be condensed or filtered according to the method of molding the polymer electrolyte membrane or applications of the polymer electrolyte membrane. The condensation method is not particularly limited and examples thereof include a method of heating the polymer electrolyte solution to vaporize the solvent, and a method of condensing the polymer electrolyte solution under reduced pressure. In the case where the polymer electrolyte solution is used as a coating solution, at an excessively high solid content rate of the polymer electrolyte solution, the viscosity tends to be increased, leading to difficulties in handling. Meanwhile, at an excessively low solid content rate, productivity tends to be reduced and the solid content rate is preferably 0.5% by mass to 50% by mass. The method of filtering the polymer electrolyte solution is not particularly limited and examples of thereof include a method of filtering the polymer electrolyte solution under pressure using a filter. As the material for the above filter, a filter whose 90% collecting particle size is 10 to 100 times the average particle size of the solid particle contained in the polymer electrolyte solution is preferably used. Examples of the filter material include paper and metal. Particularly, in the case where the filter material is paper, the 90% collecting particle size is preferably 10 to 50 times the average particle size of the solid particle. In the case where a metallic filter is used, the 90% collecting particle size is preferably 50 to 100 times the average particle size of the solid particle. By setting the 90% collecting particle size 10 times or more the average particle size, excessive increase in the pressure needed to feed the solution can be suppressed, or clogging of the filter for a short time can be suppressed. Meanwhile, the 90% collecting particle size set 100 times or less the average particle size is preferable from the viewpoint of removing aggregates of particles or a non-dissolved resin well, which cause foreign substances in the film.

[Membrane Electrode Assembly]

The polymer electrolyte membrane according to the present embodiment can be used as a material for forming a membrane electrode assembly and a polymer electrolyte fuel cell. A unit in which two electrode catalyst layers of an anode and a cathode are bonded to both surfaces of the polymer electrolyte membrane is called a membrane electrode assembly (hereinafter, referred to as an "MEA" in some cases). Another unit in which each of gas diffusion layers forming a pair is bonded to an outer side of the electrode catalyst layer facing each other is also called the MEA in some cases. The MEA according to the present embodiment may have the same configuration as that in a known MEA except that the polymer electrolyte membrane according to the present embodiment is used.

Usually, the electrode catalyst layer comprises fine particles of a catalyst metal and a conductive agent that carries the catalyst metal. When necessary, the electrode catalyst layer contains a water-repellent. The catalyst may be any metal that promotes an oxidation reaction of hydrogen and a reduction reaction of oxygen. Examples of the catalyst include one or more selected from the group consisting of platinum, gold, silver, palladium, iridium, rhodium, ruthenium, iron, cobalt, nickel, chromium, tungsten, manganese, vanadium, and an alloy thereof. Among these, platinum is mainly preferable.

As the method of producing an MEA, a known production method can be used using the polymer electrolyte membrane according to the present embodiment and examples thereof include the following method. First, a binder ion exchange resin for an electrode is dissolved in a mixed solution of alcohol and water. Platinum-carrying carbon as an electrode substance is dispersed in the mixed solution to prepare a paste. The paste is applied on PTFE sheets with a fixed amount and dried. Next, the PTFE sheets of which coating surfaces face each other and the polymer electrolyte membrane which is sandwiched between the coating surfaces are bonded by thermal press at 100° C. to 200° C. and then an MEA can be obtained. Usually, as the binder for an electrode, those obtained by dissolving an ion exchange resin in a solvent (alcohol, water, and the like) are used. However, the polymer electrolyte solution according to the present embodiment can also be used and is preferable from the viewpoint of durability.

[Polymer Electrolyte Fuel Cell]

The thus-obtained MEA, which may be the MEA having a structure in which each of the gas diffusion electrodes in pair is formed on the outer side of the electrode catalyst layer facing each other, forms the polymer electrolyte fuel cell in combination with components used in ordinary polymer electrolyte fuel cells such as a bipolar plate and a backing plate. Such a polymer electrolyte fuel cell may have the same configuration as that of a known polymer electrolyte fuel cell except that the MEA above is used as the MEA.

The bipolar plate means a plate formed of a composite material of graphite and resin or metallic plate or the like whose surface has a groove for flowing a fuel or a gas such as an oxidizing agent. The bipolar plate has a function to transfer electrons to an external load circuit, and a function as a flow path to feed the fuel or the oxidizing agent to the vicinity of the electrode catalyst. By interposing the MEA between such bipolar plates and laminating plurally, the polymer electrolyte fuel cell according to the present embodiment is produced.

The polymer electrolyte membrane according to the present embodiment describe above has high moisture content, dimensional stability, mechanical strength, and physical durability, and is suitable for an electrolyte material for the polymer electrolyte fuel cell.

As above, the embodiment for implementing the present invention has been described, but the present invention will not be limited to the present embodiment. The present invention can be modified in various ways without departing from the gist.

Unless otherwise specified, the variety of parameters described above are measured according to the measurement methods in Examples below.

EXAMPLES

Hereinafter, the present invention will be more specifically described using Examples, but the present invention will not be limited to these Examples only. Methods for measuring and evaluating a variety of physical properties in Examples are as follows.

(1) Pore Distribution of Microporous Membrane

The pore distribution of the microporous membrane was measured as follows. First, a microporous membrane sample was cut into a size of φ25 mm, and measured using a through pore distribution/gas and fluid permeability analyzer (made by Xonics Corporation, apparatus name: Porometer 3G). The measurement in this apparatus uses a method according to the bubble point method according to JIS-K-3832 and is a method in which a pore distribution is determined from the surface tension of the test liquid, the applied pressure of the gas, and the flow rate of the gas to be fed by filling a test liquid (porofil (registered trademark)) into the pore volume of the microporous membrane completely and then increasing a pressure applied to the microporous membrane gradually increased (half dry/bubble point method).

The pore distribution of the microporous membrane was measured at a measured pore range: 0.065 μm to 10.0 μm and the gas to flow: compressed air.

The abundance of pores was calculated by the following expression:

(abundance of pores)=(the number of pores in a pore diameter range of 0.3 μm to 5.0 μm)/(the total number of pores in a pore diameter range of 0.065 μm to 10.0 μm in the microporous membrane)

(2) Moisture Content

The moisture content at 80° C. of the polymer electrolyte membrane was measured as follows. First, a polymer electrolyte membrane was cut into a 30 mm×40 mm square to obtain a sample and the film thickness was measured. Next, the membrane sample was immersed into ion exchange water heated to 80° C. After 1 hour passed, the membrane was extracted from 80° C. ion exchange water and was pressed lightly a few times with filter paper which sandwiched the membrane sample to remove water adhering to the surface of the membrane sample. Then, the weight of the membrane was measured using an electric balance. The weight was defined as W1 (g). Next, the membrane sample was dried in a constant temperature and humidity chamber (23° C., 50% RH). After 1 hour or more passed, the membrane sample was placed in a halogen moisture analyzer (made by Mettler-Toledo International Inc., HB43), and dried at 160° C. for 1 minute. Then, the weight of the membrane sample was measured. This absolute dry weight of the membrane sample was defined as W2 (g). The moisture content at 80° C. of the polymer electrolyte membrane was calculated from W1 and W2 above by the following expression:

moisture content=$(W1-W2)/W2 \times 100$ (3) Ion Exchange Capacity

A membrane was formed from the polymer electrolyte in which the counter ion of the ion exchange group was in the state of a proton (the area of one main surface was approximately 2 to 20 cm$^2$). The membrane was immersed in 30 mL of a 25° C. saturated NaCl aqueous solution, and left for 30 minutes while the aqueous solution was stirred. Next, using phenolphthalein as an indicator, the proton in the saturated NaCl aqueous solution was neutralized and titrated with 0.01 N sodium hydroxide aqueous solution. After neutralization and filtration, the obtained polymer electrolyte membrane in which the counter ion of the ion exchange group was in the state of sodium ion was washed with pure water and vacuum dried, and then weighed. The equivalent mass EW (g/equivalent) was determined using the following expression, wherein M (mmol) was the amount of sodium hydroxide needed for neutralization and W (mg) was the mass of the membrane comprising the polymer electrolyte in which the counter ion of the ion exchange group was sodium ion:

$EW=(W/M)-22$

Further, the ion exchange capacity (meq/g) was calculated by multiplying the inverse of the obtained EW value with 1000.

(4) Film Thickness

The membrane sample was left as it was in a constant temperature and humidity chamber at 23° C. and 50% RH for 1 hour or more. Then, using a film thickness gauge (made by Toyo Seiki Seisaku-sho, Ltd., trade name "B-1"), the film thickness was measured.

(5) Tensile Strength and Modulus

The membrane sample was cut into a rectangle of 70 mm×10 mm, and the tensile strength and modulus of the sample were measured according to JIS K-7127.

(6) Dimensional Change in Plane Direction

The membrane sample was cut into a rectangle of 4 cm×3 cm, and left as it was in a constant temperature and humidity chamber (23° C., 50% RH) for 1 hour or more. Then, the lengths in the plane direction of the dry rectangular membrane sample were measured.

Next, the rectangular membrane sample whose lengths were measured was boiled in hot water of 80° C. for 1 hour to sufficiently absorb water and become wet such that the amount of change in the mass of the electrolyte membrane by moisture was 5% or less (such that swelling of the volume by absorption of water reached to the saturation). At this time, the membrane was extracted from hot water, and the moisture on the surface was sufficiently removed.

In this state, the membrane was measured using an electric balance, and it was found that the amount of change in the mass was 5% or less. The swelling and wet membrane sample that absorbed water was extracted from hot water, and the lengths in the plane direction (mechanical (MD) direction, traverse (TD) direction) were measured. Using the lengths in the plane direction of the dry sample as the reference, the average of the amount of increase from the lengths in the plane direction of the dry sample to the lengths in the plane direction of the wet sample was defined as the dimensional change in the plane direction (%).

(7) Glass Transition Temperature

The glass transition temperature of the fluorine-based polymer electrolyte composition was measured according to JIS-C-6481. First, a membrane comprising the fluorine-based polymer electrolyte composition was formed, and cut at a width of 5 mm. Using a dynamic rheometer (made by IT Keisoku Seigyo K.K., type: DVA-225), the temperature of the test piece was raised from room temperature at a rate of 2° C./min, the dynamic viscoelasticity and loss tangent of the test piece were measured with the rheometer. The peak temperature of the measured loss tangent was defined as the glass transition temperature.

(8) Porosity

The porosity of the microporous membrane was measured by mercury porosimetry using a mercury porosimeter (made by SHIMADZU Corporation, product name: AutoPore IV 9520). First, one sheet of the microporous membrane was cut into a size at a width of approximately 25 mm, and approximately 0.08 to 0.12 g of the membrane was taken. The membrane was folded, and placed in a standard cell. The measurement was performed at an initial pressure of approximately 25 kpa. The value of the porosity obtained from the measurement was defined as the porosity of the microporous membrane.

(9) Evaluation of Fuel Cell

A fuel cell using the polymer electrolyte membrane was evaluated as follows. First, an electrode catalyst layer was produced as follows. 3.31 g of polymer solution obtained by condensing 5% by mass of a perfluorosulfonic acid polymer solution SS-910 (made by Asahi Kasei E-materials Corp., equivalent mass (EW): 910, solvent composition: ethanol/water=50/50 (mass ratio)) to 11% by mass was added to 1.00 g of a Pt-carrying carbon (made by TANAKA KIKINZOKU KOGYO K.K., TEC10E40E, Pt of 36.4%). Further, 3.24 g of ethanol was added. Then, these were sufficiently mixed with a homogenizer to obtain an electrode ink. The electrode ink was applied onto a PTFE sheet by a screen printing method. The amount of application was two patterns: the amount of Pt to be carried and the amount of the polymer to be carried were 0.15 mg/cm$^2$, and the amount of Pt to be carried and the amount of the polymer to be carried were 0.30 mg/cm$^2$. After application, the electrode ink was dried under room temperature for 1 hour and in the air at 120° C. for 1 hour to obtain an electrode catalyst layer having a thickness of approximately 10 μm. Among these electrode catalyst layers, the electrode catalyst layer having the amount of Pt to be carried of 0.15 mg/cm$^2$ and the amount of the polymer to be carried of 0.15 mg/cm$^2$ was used as the anode catalyst layer, and the electrode catalyst layer having the amount of Pt to be carried of 0.30 mg/cm$^2$ and the amount of the polymer to be carried of 0.30 mg/cm$^2$ was used as the cathode catalyst layer.

The anode catalyst layer and the cathode catalyst layer thus obtained faced each other, and the polymer electrolyte membrane was interposed therebetween. These were hot pressed at 160° C. and a plane pressure of 0.1 MPa. Thereby, the anode catalyst layer and the cathode catalyst layer were transferred and bonded to the polymer electrolyte membrane to produce an MEA.

A carbon cloth (made by DE NORA NORTH AMERICA, ELAT (registered trademark) B-1) as a gas diffusion layer was set on both sides of the MEA (outer surfaces of the anode catalyst layer and the cathode catalyst layer), and incorporated into a cell for evaluation. The cell for evaluation was set in a fuel cell evaluation system 890CL (made by TOYO Corporation) and temperature was raised to 80° C. Then, hydrogen gas was flowed on the anode side at 260 cc/min, and air gas was flowed on the cathode side at 880 cc/min. Pressure was applied to the anode side and the cathode side at 0.20 MPa (absolute pressure). The gas was moisturized by a water bubbling method. Hydrogen gas was moisturized at 90° C. and fed to the cell, and air gas was moisturized at 80° C. and fed to the cell. In this state, a current voltage curve was measured and initial properties were examined.

Next, a durability test was performed at a cell temperature of 80° C. The gas moisturizing temperature of the anode was 45° C., and that of the cathode was 80° C. Pressure was applied to the anode side at 0.10 MPa (absolute pressure), and to the cathode side at 0.05 MPa (absolute pressure). In this state, power generation was performed at a current density of 0.1 A/cm$^2$ for 1 minute. Subsequently, the circuit was opened for 3 minutes such that the current value was 0, and the OCV (open circuit voltage) was examined. The power generation and OCV were repeated. This operation was considered as a durability test. In the test, dry and wet dimensional change of the polymer electrolyte is caused by repetition of the power generation and OCV to promote physical degradation of the polymer electrolyte, and chemical degradation of the polymer electrolyte membrane is promoted when the OCV state is held.

In the durability test, when pinholes are produced in the polymer electrolyte membrane, a phenomenon called cross leakage happens in which a large amount of hydrogen gas leaks to the cathode side. In order to examine the amount of cross leakage, the concentration of hydrogen of the exhaust gas in the cathode side was measured with a micro GC (made by Varian Inc., type: CP4900). When the measurement value exceeded 10,000 ppm, the test was completed. The durability test shows that chemical durability and physical durability are met in the polymer electrolyte membrane at the same time more significantly as the time from the start to the end of the test is longer. Using the time from the start to the end of the test for evaluation in the durability test, durability was determined on the criterion below:

◎: durability of 500 Hr or more was shown,
○: durability of 400 Hr or more and less than 500 Hr was shown,
Δ: durability of 100 Hr or more and less than 400 Hr was shown, and
X: durability of less than 100 Hr was shown.

Example 1

Production of Polymer Electrolyte Solution

First, a pellet of a precursor of a perfluorosulfonic acid resin obtained from tetrafluoroethylene and $CF_2$=CFO$(CF_2)_2$—$SO_2F$ (ion exchange capacity after hydrolysis and acid treatment: 1.4 meq/g), which is the precursor polymer of the polymer electrolyte, was prepared. Next, the precursor pellet was contacted at 80° C. for 20 hours with an aqueous solution obtained by dissolving potassium hydroxide (15% by mass) and methyl alcohol (50% by mass) to hydrolyze the precursor pellet. Then, the pellet was immersed in water at 60° C. for 5 hours. Next, the pellet after immersion in water was subjected to a treatment to immerse the pellet in a 60° C. 2 N hydrochloric acid aqueous solution for 1 hour. This treatment was repeated 5 times by exchanging the hydrochloric acid aqueous solution for new one every time. Then, the pellet subjected to the treatment to repeatedly immerse the pellet in the hydrochloric acid aqueous solution was washed with ion exchange water, and dried. Thereby, a perfluorocarbon sulfonate resin (PFSA) as the polymer electrolyte was obtained.

The pellet was placed in a 5 L autoclave with an ethanol aqueous solution (water:ethanol=50.0/50.0 (mass ratio)). The autoclave was sealed. While the solution was stirred with a blade, the temperature was raised to 160° C. and kept for 5 hours. Then, the autoclave was naturally cooled to obtain a uniform perfluorocarbon sulfonate resin solution having a concentration of the solid content of 5% by mass.

The perfluorocarbon sulfonate resin solution was condensed under reduced pressure at 80° C., and diluted with water and ethanol. Thereby, a solution having a viscosity of 500 cP, a solid content of 15.0% by mass, and ethanol:water=60:40 (mass ratio) was prepared. This solution was defined as Solution 1.

(Production of Microporous Membrane)

463 mL of a hydrocarbon oil as an extrusion liquid lubricant oil was added to 1 kg of PTFE fine powder having the number average molecular weight of 6,500,000 at 20° C., and mixed.

Next, the mixture was paste extruded to obtain a round bar-shaped molded body, and the molded body was molded into a film by a calendar roll heated to 70° C. to obtain a PTFE film. The film was passed through a 250° C. hot air drying furnace to vaporize and remove the extrusion aid. Thereby, a non-burned film having an average thickness of 300 μm and an average width of 150 mm.

Next, the non-burned PTFE film was stretched in the longitudinal direction (MD direction) at a draw ratio of 6.6 times, and wounded.

The obtained PTFE film stretched in the MD direction was stretched in the transverse direction (TD direction) at a draw ratio of 8 times with being clipped at both ends and heat-set was conducted, and then a stretched PTFE membrane having a thickness of 10 μm was obtained. The stretch temperature at this time was 290° C., and the heat-set temperature was 360° C. The obtained PTFE microporous membrane was Microporous Membrane 1. The pore distribution of the obtained Microporous Membrane 1 is shown in FIG. 1(a). The center of distribution in the pore distribution of Microporous Membrane 1 was 1.29 μm.

The absolute strength of the microporous membrane was 2.5 N/cm in the longitudinal direction (MD direction) and 1.7 N/cm in the transverse direction (TD direction).

(Production of Polymer Electrolyte Membrane)

The above-described Solution 1 was applied onto a base film using a bar coater (made by Matsuo Sangyo Co., Ltd., bar No. 200, WET film thickness of 200 μm) (area to be applied: width of approximately 200 mm×length of approximately 500 mm). Then, in the state where Solution 1 was not dried completely, PTFE Microporous Membrane 1 (film thickness: 10 μm, porosity: 82%, sample size: width of 200 mm×length of 500 mm) was laminated on Solution 1 and Solution 1 and microporous membrane were compression bonded by using a rubber roller from the side of microporous membrane. At this time, it was checked visually that the solution was filled into a part of the microporous membrane, and then the membrane was dried in an oven at 90° C. for 20 minutes. Next, Solution 1 was laminated on the PTFE microporous membrane of the obtained membrane in the same manner to sufficiently fill the pores of the microporous membrane with Solution 1. Then, the membrane was further dried in an oven at 90° C. for 20 minutes. The thus-obtained "PTFE microporous membrane sufficiently impregnated with Solution 1" was subjected to a heat treatment in an oven at 170° C. for 1 hour to obtain a polymer electrolyte membrane having a film thickness of approximately 25 μm. The results of evaluation of the polymer electrolyte membrane are shown in Table 1.

Example 2

Production of Polymer Electrolyte Solution

First, a pellet of a precursor of a perfluorosulfonic acid resin obtained from tetrafluoroethylene and $CF_2=CFO$ $(CF_2)_2$—$SO_2F$ (ion exchange capacity after hydrolysis and acid treatment: 1.4 meq/g), which is the precursor polymer of the polymer electrolyte, was prepared. Next, the precursor pellet was melt kneaded with polyphenylene sulfide (made by Sigma-Aldrich Japan, Inc., melt viscosity at 310° C. of 275 poise) at a mass ratio of 90/10 using a twin-screw extruder (made by WERNER & PELEIDERER GmbH & Co. KG, type: ZSK-40, kneading temperature of 280 to 310° C., number of rotation of a screw of 200 rpm). The melt kneaded resin was cut by passing the resin through a strand die to obtain a cylindrical pellet having a diameter of approximately 2 mm and a length of approximately 2 mm. The cylindrical pellet was contacted at 80° C. for 20 hours with an aqueous solution obtained by dissolving potassium hydroxide (15% by mass) and methyl alcohol (50% by mass) to conduct hydrolysis treatment. Then, the pellet was immersed in water at 60° C. for 5 hours. Next, the pellet after immersion in water was subjected to a treatment to immerse the pellet in a 60° C. 2 N hydrochloric acid aqueous solution for 1 hour. The treatment was repeated 5 times by exchanging the hydrochloric acid aqueous solution for new one every time. Then, the pellet subjected to the treatment to repeatedly immerse the pellet in the hydrochloric acid aqueous solution was washed with ion exchange water, and dried. Thereby, a pellet of a perfluorocarbon sulfonate resin (PFSA) as the polymer electrolyte was obtained.

The pellet was placed in a 5 L autoclave with an ethanol aqueous solution (water:ethanol=50.0:50.0 (mass ratio)). The autoclave was sealed. While the solution was stirred with a blade, the temperature was raised to 160° C. and kept for 5 hours. Then, the autoclave was naturally cooled to obtain a uniform perfluorocarbon sulfonate resin solution having a concentration of the solid content of 5% by mass. The particle diameter of polyphenylene sulfide in the perfluorocarbon sulfonate resin solution was measured using a laser diffraction/scattering particle size distribution analyzer (made by HORIBA, Ltd., type: LA-950, the measurement sample was used by diluting the solution with water, refractive index of 1.33). The median diameter of the dispersed polyphenylene sulfide particles was 0.23 μm, and the average particle size was 0.98 μm. The perfluorocarbon sulfonate resin was condensed under reduced pressure at 80° C., and diluted with water and ethanol. Thereby, a solution having a viscosity of 500 cP, a solid content of 15.1% by mass, and ethanol:water=60:40 (mass ratio) was prepared. The solution was defined as Solution 2.

(Production of Microporous Membrane)

Microporous Membrane 1 was prepared in the same manner as in Example 1.

(Production of Polymer Electrolyte Membrane)

A polymer electrolyte membrane was obtained in the same manner as in Example 1 except that Solution 1 was replaced by Solution 2. The results of evaluation are shown in Table 1.

Example 3

Production of Polymer Electrolyte Solution

The precursor pellet of the perfluorosulfonic acid resin obtained from tetrafluoroethylene and $CF_2=CFO(CF_2)_2$—$SO_2F$, which is the precursor polymer of the polymer electrolyte, was melt kneaded with polyphenylene sulfide (made by Sigma-Aldrich Japan, Inc., melt viscosity at 310° C. of 275 poise) at a mass ratio of 90/10 using a twin-screw extruder (made by WERNER & PELEIDERER GmbH & Co. KG, type:ZSK-40, kneading temperature of 280 to 310°

C., number of rotation of a screw of 200 rpm). The melt kneaded resin was cut by passing the resin through a strand die to obtain a cylindrical pellet having a diameter of approximately 2 mm and a length of approximately 2 mm. The cylindrical pellet was subjected to hydrolysis and acid treatment in the same manner as in Example 1, and dissolved in a 5 L autoclave to obtain Solution A having the concentration of the solid content of 5%. The particle diameter of polyphenylene sulfide in Solution A was measured using a laser diffraction/scattering particle size distribution analyzer (made by HORIBA, Ltd., type: LA-950, the measurement sample was used by diluting the solution with water, refractive index of 1.33). The median diameter of the dispersed polyphenylene sulfide particle was 0.23 μm.

Next, dimethylacetamide (DMAC) was added to 5% by mass of a perfluorocarbon acid polymer solution (Aciplex-SS (registered trademark), made by Asahi Kasei E-materials Corp., ion exchange capacity: 1.4 meq/g, solvent composition (mass ratio):ethanol/water=50/50) (Solution B-1), and the solution was refluxed at 120° C. for 1 hour. Then, condensation was performed under reduced pressure using an evaporator to produce a solution (Solution B-2) having a mass ratio of perfluorocarbon sulfonate resin to DMAC of 1.5/98.5.

Further, poly[2,2'-(m-phenylene)-5,5'-bibenzimidazole] (PBI) (made by Sigma-Aldrich Japan, Inc., weight average molecular weight of 27,000) was placed in an autoclave with DMAC. The autoclave was sealed. The temperature was raised to 200° C. and kept for 5 hours. Then, the autoclave was naturally cooled to obtain a PBI solution having a mass ratio of PBI to DMA of 10/90. Further, the PBI solution was diluted with DMAC at a dilution factor of 10 to produce a 1% by mass uniform PBI solution. The solution was Solution C.

The solutions were mixed at Solution A/Solution B-1/ Solution B-2/Solution C=30.6/14.9/46.9/7.6 (mass ratio), and stirred until the solution became uniform. Thereby, a mixed solution of perfluorocarbon sulfonate resin/polyphenylene sulfide resin/PBI=92.5/5/2.5 (mass ratio) was obtained. The mixed solution was defined as Solution 3.
(Production of Microporous Membrane)

Microporous Membrane 1 was prepared in the same manner as in Example 1.
(Production of Polymer Electrolyte Membrane)

A polymer electrolyte membrane was obtained in the same manner as in Example 1 except that Solution 1 was replaced by Solution 3. The results of evaluation are shown in Table 1.

Example 4

Production of Polymer Electrolyte Solution

Solution 1 was prepared in the same manner as in Example 1.
(Production of Microporous Membrane)

300 mL of a hydrocarbon oil as an extrusion liquid lubricant oil was added to 1 kg of PTFE fine powder having the number average molecular weight of 12,000,000 at 20° C., and mixed.

Next, the mixture was paste extruded to obtain a round bar-shaped molded body, and the molded body was molded into a film by heating to 70° C. with a calendar roll to obtain a PTFE film. The film was passed through a 250° C. hot air drying furnace to vaporize and remove the extrusion aid. Thereby, a non-burned film having an average thickness of 200 μm and an average width of 280 mm was obtained.

Next, the non-burned PTFE film was stretched in the longitudinal direction (MD direction) at a draw ratio of 5 times, and wounded.

The obtained PTFE film stretched in the MD direction was stretched in the transverse direction (TD direction) at a draw ratio of 5 times with being clipped at both ends and heat-set was conducted and then a stretched PTFE membrane having a thickness of 12 μm was obtained. At this time, the stretch temperature was 290° C., and the thermal setting temperature was 360° C. The obtained PTFE microporous membrane was defined as Microporous Membrane 2. The pore distribution of the obtained Microporous Membrane 2 is shown in FIG. 1(b). The center of distribution in the pore distribution of Microporous Membrane 2 was 1.18 μm.

The absolute strength of the microporous membrane was 3.3 N/cm in the longitudinal direction (MD direction) and 3.6 N/cm in the transverse direction (TD direction).
(Production of Polymer Electrolyte Membrane)

A polymer electrolyte membrane having a film thickness of 24 μm was obtained in the same manner as in Example 1 except that Microporous Membrane 2 (film thickness: 12 μm, porosity: 90%) was used as the microporous membrane. The results of evaluation of the polymer electrolyte membrane are shown in Table 1.

Example 5

Production of Polymer Electrolyte Solution

Solution 3 was prepared in the same manner as in Example 3.
(Production of Microporous Membrane)

A microporous membrane (center of distribution in the pore distribution was 0.2 μm) having a thickness of 8 μm was obtained by the same method as that in Microporous Membrane 2 except that the draw ratio in the longitudinal direction (MD direction) was 15 times and the draw ratio in the transverse direction (TD direction) was 8 times. The microporous membrane was defined as Microporous Membrane 4. A microporous membrane having a thickness of 8 μm was obtained by the same method as that in Microporous Membrane 2 (center of distribution in the pore distribution was 0.7 μm) except that the microporous membrane was stretched in the longitudinal direction (MD direction) and the transverse direction (TD direction) at the same time. The microporous membrane was defined as Microporous Membrane 5.

The absolute strengths of Microporous Membranes 4 and 5 were 32 N/cm in the longitudinal direction (MD direction) and 16 N/cm in the transverse direction (TD direction).
(Production of Polymer Electrolyte Membrane)

A polymer electrolyte membrane having a film thickness of 20 μm was obtained in the same manner as in Example 1 except that Microporous Membrane 4 (film thickness: 8 μm, porosity: 90%) and Microporous Membrane 5 (film thickness: 8 μm, porosity: 90%) were used as the microporous membrane. The results of evaluation of the polymer electrolyte membrane are shown in Table 1.

Example 6

Production of Polymer Electrolyte Solution

Solution 3 was prepared in the same manner as in Example 3.

(Production of Microporous Membrane)

A microporous membrane having a thickness of 16 μm (center of distribution in the pore distribution was 1.1 μm) was obtained by the same method as that in Microporous Membrane 2 except that the draw ratios in the longitudinal direction (MD direction) and in the transverse direction (TD direction) were 8 times, and the microporous membrane was stretched at the same time. The microporous membrane was defined as Microporous Membrane 6.

The absolute strength of Microporous Membrane 6 was 20 N/cm in the longitudinal direction (MD direction) and 6.4 N/cm in the transverse direction (TD direction).

(Production of Polymer Electrolyte Membrane)

A polymer electrolyte membrane having a film thickness of 20 μm was obtained in the same manner as in Example 1 except that Microporous Membrane 6 (film thickness: 16 μm, porosity: 90%) was used as the microporous membrane. The results of evaluation of the polymer electrolyte membrane are shown in Table 1.

Example 7

Production of Polymer Electrolyte Solution

Solution 3 was prepared in the same manner as in Example 3.

(Production of Microporous Membrane)

A microporous membrane having a thickness of 8 μm (center of distribution in the pore distribution was 1.0 μm) was obtained by the same method as that in Microporous Membrane 2 except that the draw ratio in the longitudinal direction (MD direction) and the draw ratio in the transverse direction (TD direction) were 7 times. The microporous membrane was defined as Microporous Membrane 7. The absolute strength of the Microporous Membrane 7 was 3.2 N/cm in the longitudinal direction (MD direction) and 6.4 N/cm in the transverse direction (TD direction).

(Production of Polymer Electrolyte Membrane)

A polymer electrolyte membrane having a film thickness of 20 μm was obtained in the same manner as in Example 1 except that Microporous Membrane 7 (film thickness: 8 μm, porosity: 90%) was used as the microporous membrane. The results of evaluation of the polymer electrolyte membrane are shown in Table 1.

Example 8

Production of Polymer Electrolyte Solution

Solution 3 was prepared in the same manner as in Example 3.

(Production of Microporous Membrane)

A microporous membrane having a thickness of 7 μm (center of distribution in the pore distribution was 0.45 μm) was obtained by the same method as that in Microporous Membrane 2 except that the draw ratios in the longitudinal direction (MD direction) and in the transverse direction (TD direction) were 20 times, and the microporous membrane was stretched at the same time. The microporous membrane was defined as Microporous Membrane 8.

The absolute strength of Microporous Membrane 8 was 25 N/cm in the longitudinal direction (MD direction) and 4.2 N/cm in the transverse direction (TD direction).

(Production of Polymer Electrolyte Membrane)

A polymer electrolyte membrane having a film thickness of 20 μm was obtained in the same manner as in Example 1 except that Microporous Membrane 8 (film thickness: 7 μm, porosity: 90%) was used as the microporous membrane. The results of evaluation of the polymer electrolyte membrane are shown in Table 1.

Example 9

Production of Polymer Electrolyte Solution

Solution 3 was prepared in the same manner as in Example 3.

(Production of Microporous Membrane)

A microporous membrane having a thickness of 15 μm (center of distribution in the pore distribution was 1.1 μm) was obtained by the same method as that in Microporous Membrane 2 except that the draw ratios in the longitudinal direction (MD direction) and in the transverse direction (TD direction) were 25 times, and the microporous membrane was stretched at the same time. The microporous membrane was defined as Microporous Membrane 9.

The absolute strength of Microporous Membrane 9 was 60 N/cm in the longitudinal direction (MD direction) and 45 N/cm in the transverse direction (TD direction).

(Production of Polymer Electrolyte Membrane)

A polymer electrolyte membrane having a film thickness of 20 μm was obtained in the same manner as in Example 1 except that Microporous Membrane 9 (film thickness: 15 μm, porosity: 90%) was used as the microporous membrane. The results of evaluation of the polymer electrolyte membrane are shown in Table 1.

Example 10

Production of Polymer Electrolyte Solution

Solution 3 was prepared in the same manner as in Example 3.

(Production of Microporous Membrane)

A microporous membrane having a thickness of 13 μm (center of distribution in the pore distribution was 1.0 μm) was obtained by the same method as that in Microporous Membrane 2 except that the draw ratios in the longitudinal direction (MD direction) and in the transverse direction (TD direction) were 25 times. The microporous membrane was defined as Microporous Membrane 10.

The absolute strength of Microporous Membrane 10 was 3.9 N/cm in the longitudinal direction (MD direction) and 16 N/cm in the transverse direction (TD direction).

(Production of Polymer Electrolyte Membrane)

A polymer electrolyte membrane having a film thickness of 20 μm was obtained in the same manner as in Example 1 except that Microporous Membrane 10 (film thickness: 13 μm, porosity: 90%) was used as the microporous membrane. The results of evaluation of the polymer electrolyte membrane are shown in Table 1.

Example 11

Production of Polymer Electrolyte Solution

Solution 3 was prepared in the same manner as in Example 3.

(Production of Microporous Membrane)

A microporous membrane having thickness of 5 μm (center of distribution in the pore distribution was 0.4 μm) was obtained by the same method as that in Microporous Membrane 2 except that the draw ratio in the longitudinal direction (MD direction) was 17 times and the draw ratio in the transverse direction (TD direction) was 8 times. The microporous membrane was defined as Microporous Membrane 11.

The absolute strength of Microporous Membrane 11 was 20 N/cm in the longitudinal direction (MD direction) and 2.8 N/cm in the transverse direction (TD direction). A microporous membrane having a thickness of 12 μm (center of distribution in the pore distribution was 0.35 μm) was obtained by the same method as that in Microporous Membrane 2 except that the draw ratio in the longitudinal direction (MD direction) was 8 times and the draw ratio in the transverse direction (TD direction) was 17 times, and the microporous membrane was stretched at the same time. The microporous membrane was defined as Microporous Membrane 12.

The absolute strength of Microporous Membrane 12 was 1.2 N/cm in the longitudinal direction (MD direction) and 36 N/cm in the transverse direction (TD direction).
(Production of Polymer Electrolyte Membrane)

A polymer electrolyte membrane having a film thickness of 20 μm was obtained in the same manner as in Example 1 except that Microporous Membrane 11 (film thickness: 5 μm, porosity: 88%) and Microporous Membrane 12 (film thickness: 12 μm, porosity: 88%) were used as the microporous membrane. The results of evaluation of the polymer electrolyte membrane are shown in Table 1.

Example 12

Production of Polymer Electrolyte Solution

Solution 3 was prepared in the same manner as in Example 3.
(Production of Microporous Membrane)

A microporous membrane having thickness of 5 μm (center of distribution in the pore distribution was 0.4 μm) was obtained by the same method as that in Microporous Membrane 2 except that the draw ratio in the longitudinal direction (MD direction) was 17 times and the draw ratio in the transverse direction (TD direction) was 8 times. The microporous membrane was defined as Microporous Membrane 11.

The absolute strength of Microporous Membrane 11 was 20 N/cm in the longitudinal direction (MD direction) and 2.8 N/cm in the transverse direction (TD direction). A microporous membrane having a thickness of 9 μm (center of distribution in the pore distribution was 1.6 μm) was obtained by the same method as that in Microporous Membrane 2 except that the draw ratio in the longitudinal direction (MD direction) was 4 times and the draw ratio in the transverse direction (TD direction) was 10 times, and the microporous membrane was stretched at the same time. The microporous membrane was defined as Microporous Membrane 13.

The absolute strength of Microporous Membrane 13 was 0.9 N/cm in the longitudinal direction (MD direction) and 9 N/cm in the transverse direction (TD direction).
(Production of Polymer Electrolyte Membrane)

A polymer electrolyte membrane having a film thickness of 20 μm was obtained in the same manner as in Example 1 except that Microporous Membrane 11 (film thickness: 5 μm, porosity: 88%) and Microporous Membrane 13 (film thickness: 9 μm, porosity: 88%) were used as the microporous membrane. The results of evaluation of the polymer electrolyte membrane are shown in Table 1.

Example 13

Production of Polymer Electrolyte Solution

Solution 3 was prepared in the same manner as in Example 3.
(Production of Microporous Membrane)

A microporous membrane having a thickness of 5 μm (center of distribution in the pore distribution was 0.4 μm) was obtained by the same method as that in Microporous Membrane 2 except that the draw ratio in the longitudinal direction (MD direction) was 17 times and the draw ratio in the transverse direction (TD direction) was 8 times. The microporous membrane was defined as Microporous Membrane 11.

The absolute strength of Microporous Membrane 11 was 20 N/cm in the longitudinal direction (MD direction) and 2.8 N/cm in the transverse direction (TD direction). Microporous Membrane 14 having a thickness of 10 μm (center of distribution in the pore distribution was 0.60 μm) was obtained by the same method as that in Microporous Membrane 2 except that the draw ratio in the longitudinal direction (MD direction) was 6 times and the draw ratio in the transverse direction (TD direction) was 12 times, and the microporous membrane was stretched at the same time.

The absolute strength of Microporous Membrane 14 was 4 N/cm in the longitudinal direction (MD direction) and 10 N/cm in the transverse direction (TD direction).
(Production of Polymer Electrolyte Membrane)

A polymer electrolyte membrane having a film thickness of 20 μm was obtained in the same manner as in Example 1 except that Microporous Membrane 11 (film thickness: 5 μm, porosity: 88%) and Microporous Membrane 14 (film thickness: 10 μm, porosity: 88%) were used as the microporous membrane. The results of evaluation of the polymer electrolyte membrane are shown in Table 1.

Comparative Example 1

Production of Polymer Electrolyte Solution

Solution 2 was prepared in the same manner as in Example 2.
(Production of Polymer Electrolyte Membrane)

Approximately 42 g of "Solution 2" was poured into a petri dish having a diameter of 154 mm, and dried on a hot plate at 90° C. for 1 hour. Next, the petri dish was placed in an oven, and subjected to a heat treatment at 170° C. for 1 hour. Then, the petri dish in which a membrane was formed was extracted from the oven, and cooled. Ion exchange water was poured into the petri dish to peel off the membrane. Thus, a polymer electrolyte membrane having a film thickness of approximately 30 μm was obtained. The results of evaluation of the polymer electrolyte membrane are shown in Table 1.

Comparative Example 2

Production of Polymer Electrolyte Solution

Solution 2 was prepared in the same manner as in Example 2.
(Production of Microporous Membrane)

0.375 parts by mass of an antioxidant was added to 100 parts by mass of a polyolefin composition comprising only polypropylene having a weight average molecular weight of $4 \times 10^5$ to obtain a polyolefin composition. 30 parts by mass of the polyolefin composition was put into a twin-screw extruder (58 mmφ, L/D=42, strong kneading type). 70 parts by mass of a liquid paraffin was fed from a side feeder in the twin-screw extruder, and the materials were melt kneaded at 200 rpm to prepare a polyolefin solution in the extruder.

Subsequently, the melt kneaded product was extruded at 220° C. from a T die provided at the leading end of the extruder. A sheet was molded while the melt kneaded product was wounded by a cooling roll. Next, the molded sheet was subjected to sequential dual axis stretching at 110° C. into a size of 7×5 to obtain a stretched membrane. The obtained stretched membrane was washed with methylene chloride to extract and remove the remaining liquid paraffin. The membrane was then dried and subject to a heat treatment to obtain a polyolefin microporous membrane having a thickness of 12 μm. The pore distribution of Microporous Membrane 15 obtained is shown in FIG. 1(c). The center of distribution in the pore distribution in Microporous Membrane 15 was 0.08 μm.

The absolute strength of the microporous membrane was 3 N/cm in the longitudinal direction (MD direction) and 2.6 N/cm in the transverse direction (TD direction).

(Production of Polymer Electrolyte Membrane)

A polymer electrolyte membrane having a film thickness of 30 μm was obtained in the same manner as in Example 1 except that the thus-obtained polyolefin microporous membrane (film thickness: 12 μm, porosity: 50%) was used as the microporous membrane. The results of evaluation of the polymer electrolyte membrane are shown in Table 1.

TABLE 1

| | Polymer electrolyte | | | | Microporous membrane | | | | |
|---|---|---|---|---|---|---|---|---|---|
| | Material | Moisture content (%) | Ion exchange capacity (meq/g) | Additive Material | Material | Film thickness (μm) | Pore distribution (abundance) | Modulus (MPa) | Porosity (%) |
| Example 1 | PFSA | 45 | 1.3 | No material | PTFE | 10 | 1.00 | MD/TD 25/17 | 82 |
| Example 2 | PFSA | 45 | 1.3 | PPS | PTFE | 10 | 1.00 | MD/TD 25/17 | 82 |
| Example 3 | PFSA | 45 | 1.3 | PPS, PBI | PTFE | 10 | 1.00 | MD/TD 25/17 | 82 |
| Example 4 | PFSA | 43 | 1.3 | No material | PTFE | 12 | 1.00 | MD/TD 28/30 | 90 |
| Example 5 | PFSA | 45 | 1.3 | PPS, PBI | PTFE | 8 and 8 | 1.00 | MD/TD 400/200 | 90 |
| Example 6 | PFSA | 45 | 1.3 | PPS, PBI | PTFE | 16 | 1.00 | MD/TD 130/40 | 94 |
| Example 7 | PFSA | 45 | 1.3 | PPS, PBI | PTFE | 8 | 1.00 | MD/TD 40/80 | 85 |
| Example 8 | PFSA | 45 | 1.3 | PPS, PBI | PTFE | 7 | 1.00 | MD/TD 370/60 | 89 |
| Example 9 | PFSA | 45 | 1.3 | PPS, PBI | PTFE | 15 | 1.00 | MD/TD 400/300 | 90 |
| Example 10 | PFSA | 45 | 1.3 | PPS, PBI | PTFE | 13 | 1.00 | MD/TD 30/130 | 90 |
| Example 11 | PFSA | 45 | 1.3 | PPS, PBI | PTFE | 5 and 12 | 1.00 | MD/TD 40050 and 10/300 | 88 |
| Example 12 | PFSA | 45 | 1.3 | PPS, PBI | PTFE | 5 and 9 | 100 | MD/TD 400/50 and 10/100 | 88 |
| Example 13 | PFSA | 45 | 1.3 | PPS, PBI | PTFE | 5 and 10 | 1.00 | MD/TD 400/50 and 40/100 | 88 |
| Comparative Example 1 | PFSA | 48 | 1.3 | PPS, PBI | | | | | |
| Comparative Example 2 | PFSA | 43 | 1.3 | PPS, PBI | PP | 12 | 0.01 | MD/TD 25/22 | 50 |

| | Polymer electrolyte membrane | | | | Fuel cell test | |
|---|---|---|---|---|---|---|
| | Film thickness (μm) | Tensile strength (kgf/cm2) | Dimensional change (plane) (%) | Tg (° C.) | Initial properties (A/cm²) | Durability |
| Example 1 | 25 | 120 | 15 | 141 | 1.6 | ○ |
| Example 2 | 25 | 120 | 14 | 142 | 1.6 | ○ |
| Example 3 | 25 | 130 | 14 | 138 | 1.5 | ◉ |
| Example 4 | 24 | 120 | 16 | 138 | 1.5 | ○ |
| Example 5 | 20 | 550 | 5 | 150 | 1.5 | ◉ |
| Example 6 | 20 | 470 | 8 | 150 | 1.5 | ◉ |
| Example 7 | 20 | 440 | 14 | 150 | 1.5 | ◉ |
| Example 8 | 20 | 500 | 9 | 150 | 1.5 | ◉ |
| Example 9 | 20 | 550 | 5 | 150 | 1.5 | ◉ |
| Example 10 | 20 | 550 | 11 | 150 | 1.5 | ◉ |
| Example 11 | 20 | 440 | 4 | 150 | 1.5 | ◉ |
| Example 12 | 20 | 440 | 6 | 150 | 1.5 | ◉ |
| Example 13 | 20 | 440 | 5 | 150 | 1.5 | ◉ |

TABLE 1-continued

| | | | | | | |
|---|---|---|---|---|---|---|
| Comparative Example 1 | 30 | 130 | 23 | 140 | 1.4 | X |
| Comparative Example 2 | 30 | >1000 | 5 | 185 | 0.9 | Δ |

REFERENCE SIGNS LIST (a) pore distribution of microporous membrane curve in Example 1
(b) pore distribution of microporous membrane curve in Example 4
(c) pore distribution of microporous membrane curve in Comparative Example 2

The invention claimed is:

1. A fluorine-based polymer electrolyte membrane comprising a microporous membrane and a fluorine-based polymer electrolyte contained in a pore of the microporous membrane,
wherein the microporous membrane has a pore distribution with a at least two maxima of distribution in a pore diameter range of 0.3 μm to 5.0 μm, one maximum being from 0.5 to 1.0 μm and another being from 1.0 to 3.0 μm, and
wherein the fluorine-based polymer electrolyte is a polymer electrolyte (component A) having an ion exchange capacity of 0.5 to 3.0 meq/g.

2. The polymer electrolyte membrane according to claim 1, wherein the polymer electrolyte (component A) has an ion exchange capacity of 1.3 to 3.0 meq/g.

3. The polymer electrolyte membrane according to claim 1, wherein the polymer electrolyte membrane contains a compound having a thioether group (component B).

4. The polymer electrolyte membrane according to claim 3, wherein the compound having a thioether group (component B) has an average particle size of 0.01 to 0.5 μm.

5. The polymer electrolyte membrane according to claim 4, wherein the polymer electrolyte membrane contains a compound having an azole ring (component C).

6. The polymer electrolyte membrane according to claim 4, wherein the microporous membrane comprises polytetrafluoroethylene.

7. The polymer electrolyte membrane according to claim 1, wherein the polymer electrolyte membrane contains a compound having an azole ring (component C).

8. The polymer electrolyte membrane according to claim 7, wherein the microporous membrane comprises polytetrafluoroethylene.

9. The polymer electrolyte membrane according to claim 1, wherein the microporous membrane comprises polytetrafluoroethylene.

10. A membrane electrode assembly (MEA) comprising the polymer electrolyte membrane according to claim 1.

11. A solid polymer electrolyte fuel cell comprising the polymer electrolyte membrane according to claim 1.

* * * * *

UNITED STATES PATENT AND TRADEMARK OFFICE
CERTIFICATE OF CORRECTION

| | | |
|---|---|---|
| PATENT NO. | : 9,570,773 B2 | |
| APPLICATION NO. | : 13/877726 | |
| DATED | : February 14, 2017 | |
| INVENTOR(S) | : M. Yamane et al. | |

It is certified that error appears in the above-identified patent and that said Letters Patent is hereby corrected as shown below:

In the Claims

At Column 35, Line 24 (Claim 1, Line 6), please change "with a at least" to -- with at least --.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*